US011017306B2

(12) United States Patent
Sood et al.

(10) Patent No.: US 11,017,306 B2
(45) Date of Patent: May 25, 2021

(54) USING MACHINE LEARNING-BASED SEED HARVEST MOISTURE PREDICTIONS TO IMPROVE A COMPUTER-ASSISTED AGRICULTURAL FARM OPERATION

(71) Applicant: THE CLIMATE CORPORATION, San Francisco, CA (US)

(72) Inventors: Shilpa Sood, Chesterfield, MO (US); Matthew Sorge, Lake St. Louis, MO (US); Nikisha Shah, San Francisco, CA (US); Timothy Reich, Maryland Heights, MO (US); Herbert Ssegane, Maryland Heights, MO (US); Jason Kendrick Bull, Wildwood, MO (US); Tonya S. Ehlmann, St. Peters, MO (US); Morrison Jacobs, St. Charles, MO (US); Susan Andrea Macisaac, Jersey City, NJ (US); Bruce J. Schnicker, Kihei, HI (US); Yao Xie, San Francisco, CA (US); Allan Trapp, St. Louis, MO (US); Xiao Yang, Chesterfield, MO (US)

(73) Assignee: THE CLIMATE CORPORATION, San Francisco, CA (US)

( * ) Notice: Subject to any disclaimer, the term of this patent is extended or adjusted under 35 U.S.C. 154(b) by 33 days.

(21) Appl. No.: 16/661,860

(22) Filed: Oct. 23, 2019

(65) Prior Publication Data

US 2020/0134485 A1 Apr. 30, 2020

Related U.S. Application Data

(60) Provisional application No. 62/749,882, filed on Oct. 24, 2018, provisional application No. 62/749,863, filed on Oct. 24, 2018.

(51) Int. Cl.
*G06N 5/04* (2006.01)
*A01B 79/00* (2006.01)
*G06N 20/00* (2019.01)

(52) U.S. Cl.
CPC ............. *G06N 5/04* (2013.01); *A01B 79/005* (2013.01); *G06N 20/00* (2019.01)

(58) Field of Classification Search
None
See application file for complete search history.

(56) References Cited

U.S. PATENT DOCUMENTS

2001/0016788 A1 8/2001 Hauwiller et al.
2014/0035752 A1 2/2014 Johnson
(Continued)

OTHER PUBLICATIONS

Gailans, Evaluating Alternative, Diverse Cropping Systems that Include Canola, Wheat, and Red Clover in Iowa, Doctoral Thesis, Iowa State University, 2017, pp. 1-117 (Year: 2017).*
(Continued)

*Primary Examiner* — Wilbert L Starks
(74) *Attorney, Agent, or Firm* — Hickman Becker Bingham Ledesma LLP; Christine E. Orich

(57) ABSTRACT

Embodiments generate digital plans for agricultural fields. In an embodiment, a model receives digital inputs including stress risk data, product maturity data, field location data, planting date data, and/or harvest date data. The model mathematically correlates sets of digital inputs with threshold data associated with the stress risk data. The model is used to generate stress risk prediction data for a set of product maturity and field location combinations. In a digital plan, product maturity data or planting date data or harvest date data or field location data can be adjusted based on the stress risk prediction data. A digital plan can be transmitted to a field manager computing device. An agricultural apparatus can be moved in response to a digital plan.

22 Claims, 22 Drawing Sheets

(56) References Cited

U.S. PATENT DOCUMENTS

2014/0315717 A1 10/2014 Bhatti et al.
2016/0232621 A1 8/2016 Ethington et al.

OTHER PUBLICATIONS

Ingram, et al., Southeast Region Technical Report to the National Climate Assessment, 2012, pp. 1-334 (Year: 2012).*
Teixeira et al., "Global Hot-Spots of Heat Stress on Agricultural Crops Due to Climate Change", Agricultural and Forest Meteorology dated 2013, 10 pages.
International Searching Authority, "Search Report" in application No. PCT/US2019/057712, dated Jan. 13, 2020, 24 pages.
Current Claims in application No. PCT/US2019/057712, dated Jan. 2020, 5 pages.

* cited by examiner

Fig. 2
(a)
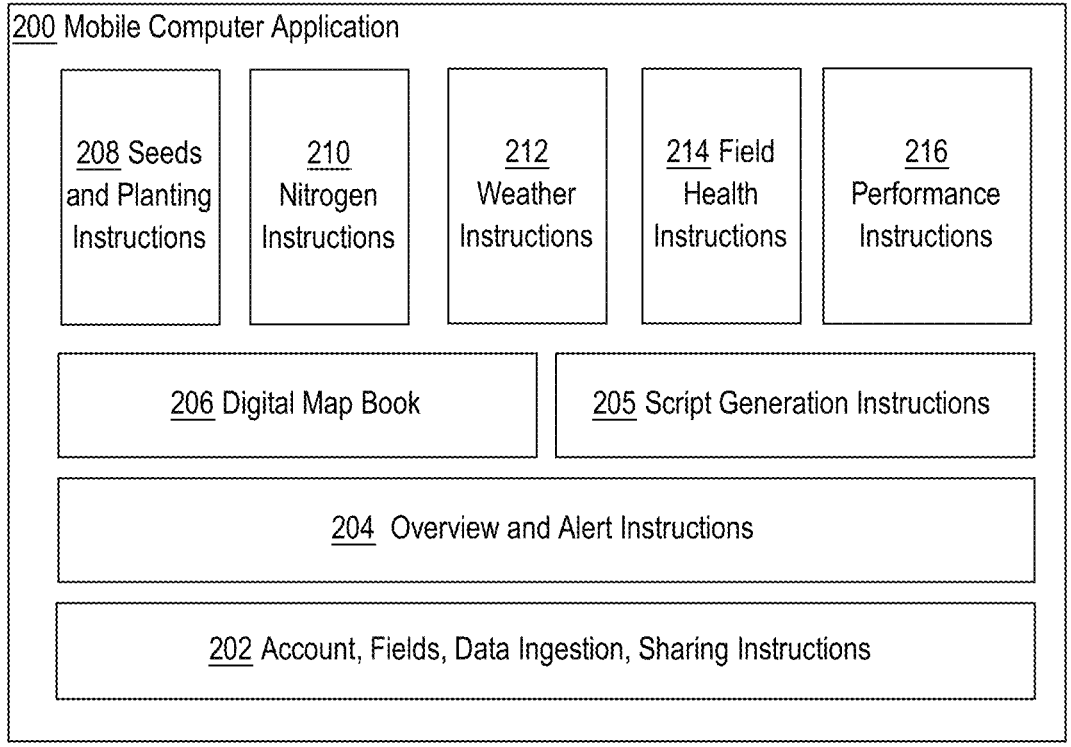
(b)
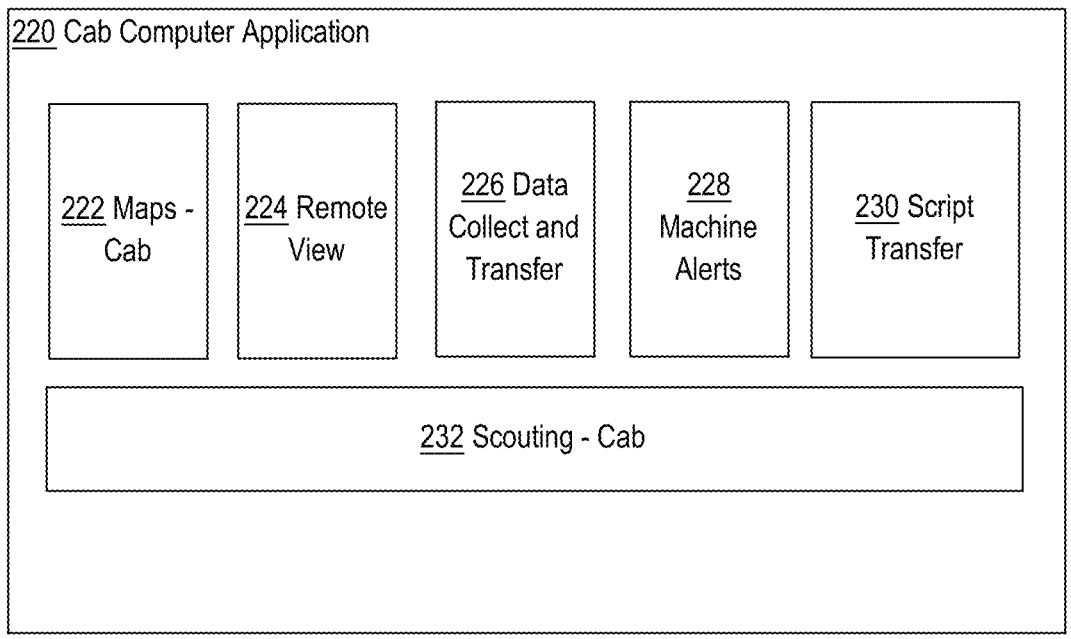

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

[+] Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

FIG. 6

1. Simple linear regression $Moisture = \alpha + \beta \cdot RM + \gamma \cdot AvgEMC.R6toHarvest + \delta \cdot R6.Harvest.interval$ 2. ATX13 model $$\frac{dM}{dt} = -\frac{k}{(rm/100)^p} \cdot (M(t) - EMC(t))$$

3. Augmented model $$\frac{dM}{dt} = -\frac{k}{(rm/100)^p} \cdot (M(t) - EMC(t))$$

$M(t = R6) = a + b \cdot (rm - 110)$

Fig. 10

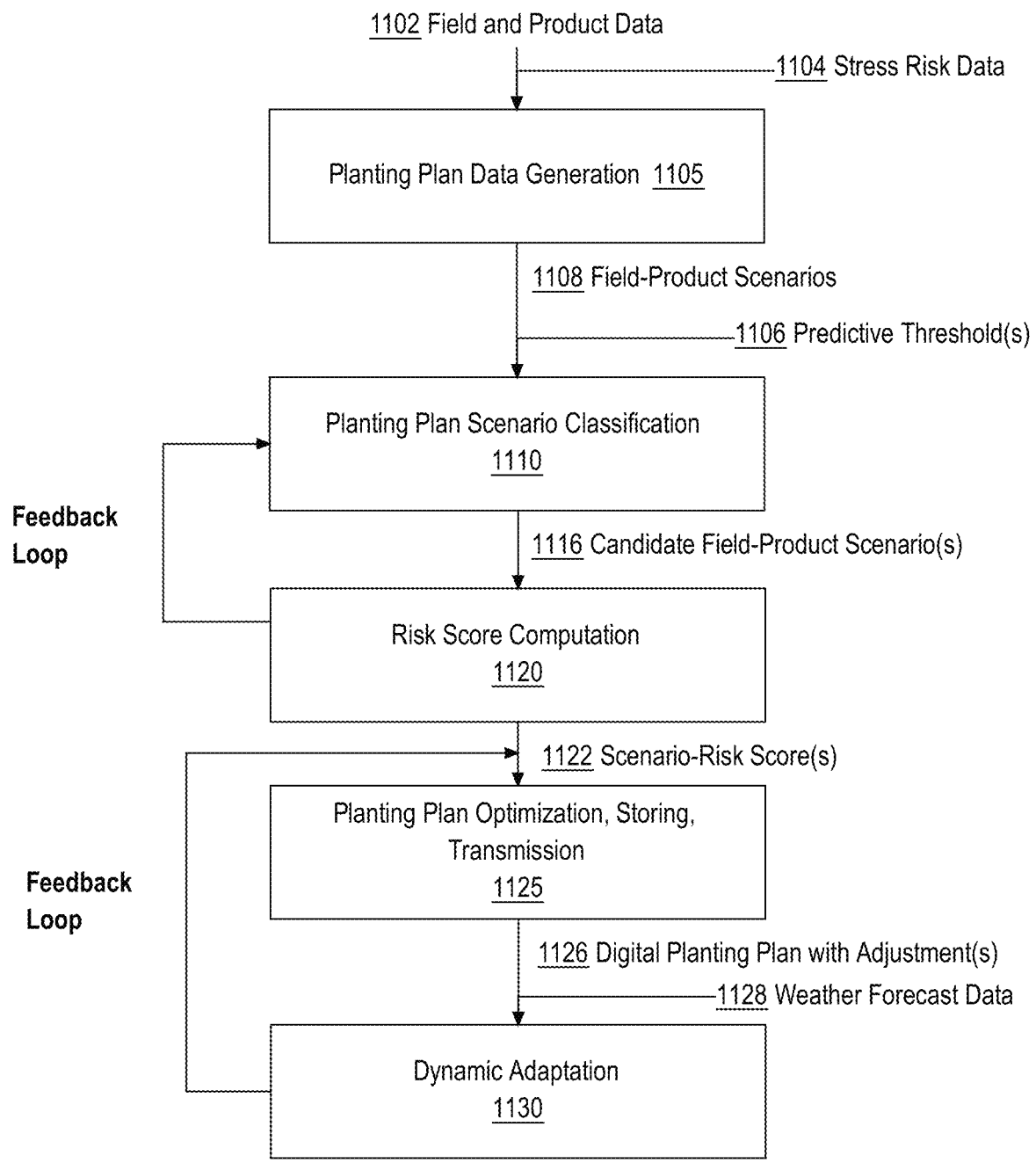

| Field | Product (RM) | Risk Score - Today (<30-Low, 30-60-Med, >60-high) | Field Readiness - TODAY | Dynamic Risk score - Next 7 days |
|---|---|---|---|---|
| 1 | B, 100RM | 10 | | ⊝ |
| 2 | C, 98RM | 44 | | ⊝ |
| ⋮ | ⋮ | ⋮ | ⋮ | ⋮ |
| ⋮ | ⋮ | ⋮ | ⋮ | ⋮ |
| 90 | B, 110RM | 63 | | ⊝ |
| 91 | Y, 100RM | 15 | | ⊝ |

Today is April 10

Fig. 14(d)

USING MACHINE LEARNING-BASED SEED HARVEST MOISTURE PREDICTIONS TO IMPROVE A COMPUTER-ASSISTED AGRICULTURAL FARM OPERATION

BENEFIT CLAIM

This application claims the benefit under 35 U.S.C. 119(e) of provisional application 62/749,882, filed Oct. 24, 2018, and provisional application 62/749,863, filed Oct. 24, 2019, the entire contents of each of which are hereby incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

The present disclosure relates to agricultural intelligence systems, and more particularly to technologies for generating digital plans for agricultural operations.

BACKGROUND

Agricultural growers often refer to historic spatio-temporal patterns of planting and harvesting operations in determining plans for subsequent growing seasons. For example, planting plans can include allocations of agricultural products to fields of a grower's agricultural operation and a corresponding schedule of planting times and harvesting times. Planting plans are often designed to maximize yield while ensuring that products are planted and harvested within a specific time window. A planting plan may include a schedule of products to be planted after a spring frost date and harvested prior to a fall frost date, for example.

Digital planting plans have been generated and displayed by mobile applications such as CLIMATE FIELDVIEW, which has been commercially available from The Climate Corporation, San Francisco, Calif.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 10 illustrates example mathematical models that may be implemented in computer program implementations such as the machine learning model of FIG. 7A.

FIG. 11(a) illustrates a programmed process by which the agricultural intelligence computer system generates a digital planting plan.

FIG. 14(a), FIG. 14(b), FIG. 14(c), FIG. 14(d), FIG. 14(e) depict several other views of example digital planting plans.

DETAILED DESCRIPTION

Figure 1:
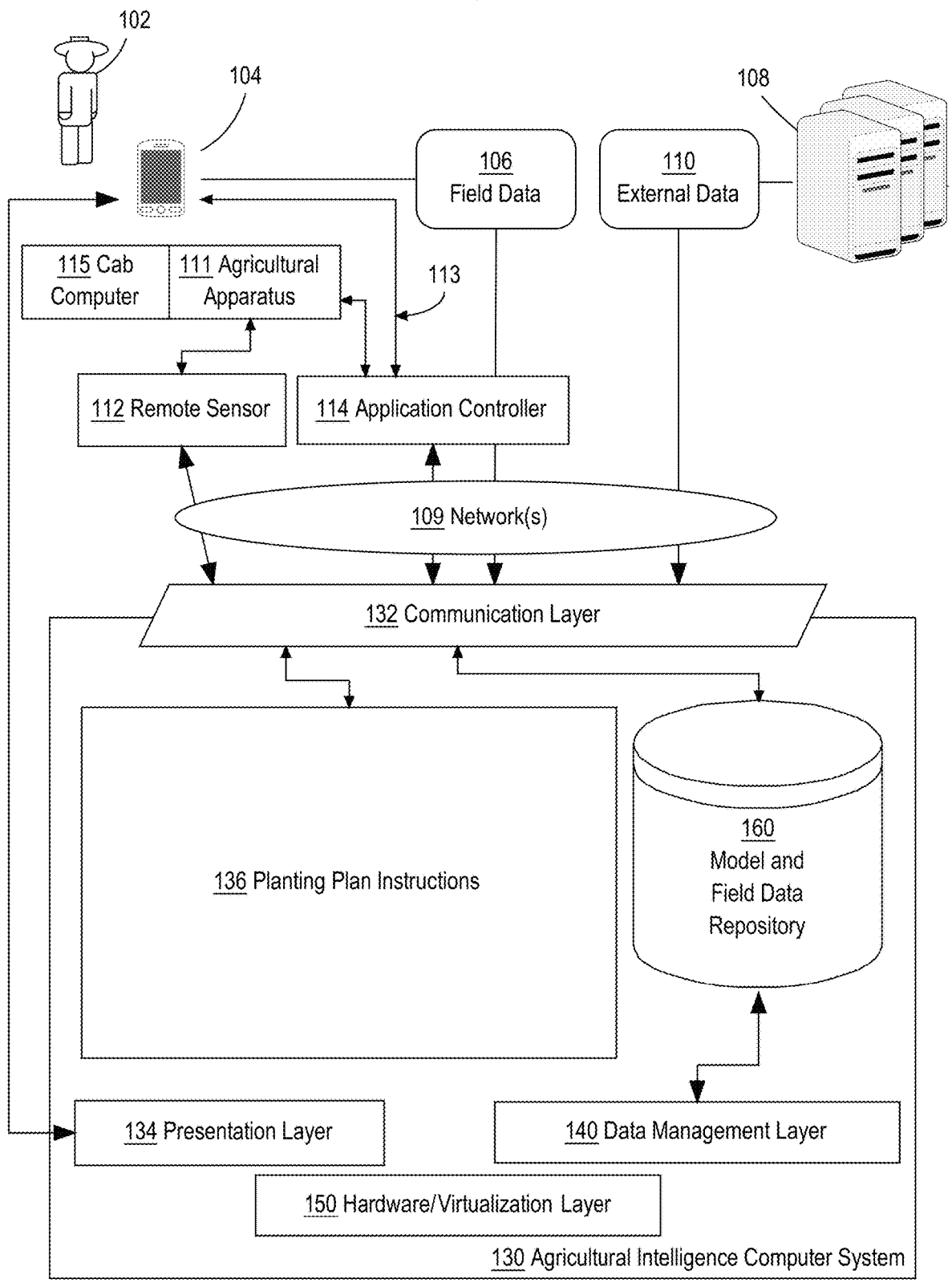
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
 2.1. STRUCTURAL OVERVIEW
 2.2. APPLICATION PROGRAM OVERVIEW
 2.3. DATA INGEST TO THE COMPUTER SYSTEM
 2.4. PROCESS OVERVIEW—AGRONOMIC MODEL TRAINING
 2.5. IMPLEMENTATION EXAMPLE—HARDWARE OVERVIEW
3. EXAMPLES OF HARVEST MOISTURE PREDICTION
 3.1. EXAMPLE HOW MODELS

4. EXAMPLE GENERATION OF DIGITAL PLAN
4.1 PROCESS OVERVIEW
4.2 CLASSIFICATION MODEL OVERVIEW
4.3 USE CASE—CREATION AND ADJUSTMENT OF DIGITAL PLANS
4.4 EXAMPLE POW MODELS
5. ADDITIONAL EXAMPLES
6. BENEFITS, EXTENSIONS AND ALTERNATIVES

1. General Overview

Weather, environmental, and operational uncertainties can affect the actual harvested yield that results from an otherwise appropriately designed and executed plan. Recent research has shown that, as a result of these uncertainties, yield losses are common at harvest time, even when a product has been planted within a desired time window and successfully avoided stress risks during the pre-harvest growth stages. Research has shown that approximately 80% of growers using state of the art agricultural planning software lose a significant amount of yield by harvesting under drier (lower than yield-optimal grain moisture) conditions.

This disclosure describes technologies to address the shortcomings of state of the art agricultural planning software by computationally generating digital planting plans to improve and protect harvest yield by improving product moisture at harvest. In an embodiment, digital planting plans are created or modified to improve the likelihood that, when an agricultural apparatus is caused to follow the planting plan, a desired harvest yield will result.

Product moisture at harvest time, or harvest moisture, is one determinant of yield volume. Product moisture as used here may refer to the amount of moisture measured as being contained within an item of product that has been planted in a field; for example, as a percentage of moisture by weight of a seed, a kernel, or a grain, at a certain stage of development after planting and prior to or at harvest time. In an embodiment, the disclosed technologies create or modify one or more parameters of digital planting plans based on predicted harvest moisture windows. A window as used herein may refer to a time interval such as a range of dates, or a number of days or months, or start and end times. For example, a planting window may refer to a range of days during which it is recommended that a product be planted in a particular field; a harvest moisture window may refer to a range of dates during which moisture of a planted product is considered desirable for harvesting, and a harvest window may refer to a range of dates during which it is recommended that harvesting operations be conducted for a particular product and field.

Embodiments of the disclosed technologies use the predicted harvest moisture windows to determine a likelihood that a product planted in a particular field will be harvested under harvest moisture conditions that are likely to produce a desired yield. Conversely, the disclosed technologies can use the predicted harvest moisture windows to determine a risk that the product will be harvested under harvest moisture conditions that are likely to produce a less than optimal yield.

Examples of parameters of digital planting plans that can be adjusted using predictions generated by the disclosed technologies include allocations of relative maturities to fields, or relative maturity distributions, planting dates/times, and harvesting dates/times.

The harvest moisture windows are determined computationally. In an embodiment, machine learning-based technologies are applied to combinations of historical and/or currently observed operational data, weather data, environmental data, and product data to generate the predicted harvest moisture windows for various field and product combinations.

In an embodiment, a planting plan is specific to a particular agricultural field of a particular grower. In some embodiments, the planting plan includes planting and/or harvesting specifications for multiple fields, or all of the fields, of a grower's agricultural operations. Embodiments of planting plans can include product portfolios, for example hybrid or relative maturity mixes, planting plans, and/or harvesting plans; as such, the term "planting plan" as used herein is not strictly limited to planting dates but may include relative maturities, harvest dates, and other information associated with agricultural operations.

Field as used herein may refer to a bounded tract of land, which may be defined by a set of acres. Product as used herein may refer to a seed product, such as a hybrid. Agricultural operation, as used herein, may refer to multiple fields, which may or may not be contiguous, in which products may be planted and harvested.

In an embodiment, multiple different products or relative maturities may be grown and harvested across an agricultural operation and a subset of those products or relative maturities may be grown in a particular field. Relative maturity as used herein may refer to a data value that indicates an amount of time after which an agricultural product is considered ready for harvest. Relative maturity can be measured in days, for example 105, 110, 115, or 120 days. Seed hybrids may be classified by relative maturity, such that many hybrids, including competing products, may be associated with a particular relative maturity. Thus, relative maturity data may be one criterion that is used to select seed hybrids to include in a planting plan.

In an embodiment, the disclosed technologies are used to generate a static planting plan based on data collected prior to initiation of planting, for example, historical field, crop, and weather data. Embodiments of static planting plans generated by the disclosed technologies include assignments of relative maturities (RMs) to fields of an agricultural operation, where the assignments of RMs to fields are designed to achieve a desired harvest moisture. Other embodiments of static planting plans generated by the disclosed technologies include assignments of planting times to field and product combinations for an agricultural operation, where the assignment of planting times to fields is designed to achieve desired harvest moistures for the products being planted.

In an embodiment, static planting plans are updated dynamically, using observed data captured during the growing season, to account for stresses due to changes in weather, environmental, and/or operational data, which may not have been accounted for in the data used to generate the static plans. Planting dates/times, harvesting dates/times, and/or relative maturity field assignments are examples of parameters of a digital planting plan that can be adjusted dynamically after the static plan is created.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via an agricultural apparatus, such as one or more agricultural machines or agricultural machine devices that interact with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
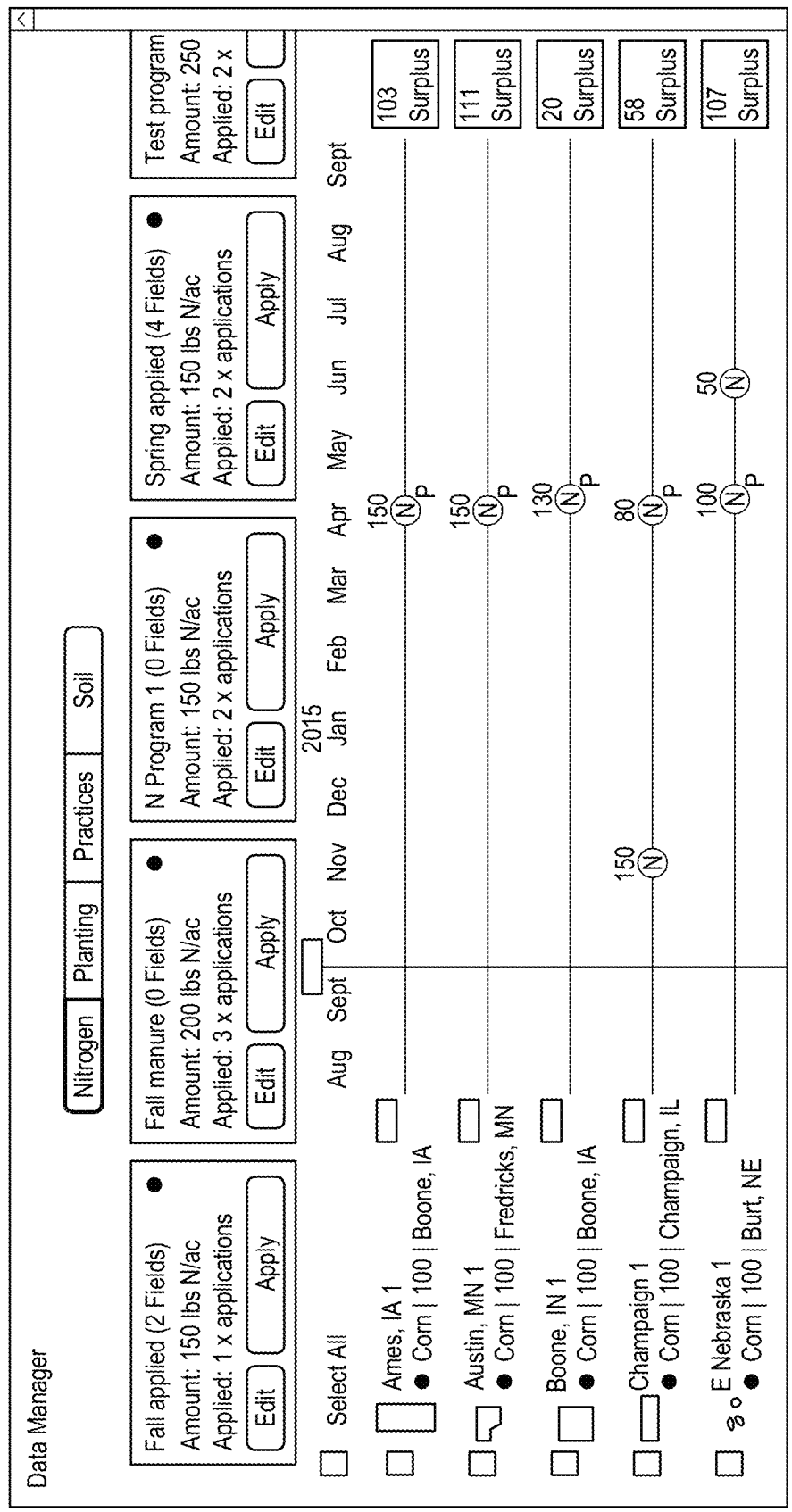
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, planting plan instructions 136 comprises a set of one or more pages of main memory, such as RAM, in the agricultural intelligence computer system 130 into which executable instructions have been loaded and which when executed cause the agricultural intelligence computing system to perform the functions or operations that are described herein with reference to those instructions. For example, planting plan instructions 136 may comprise a set of pages in RAM that contain instructions which when executed cause performing the planting plan functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, planting plan instructions 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

An embodiment of planting plan instructions 136 and its operation are described in detail below with reference to FIGS. 11-14.

Figure 4:
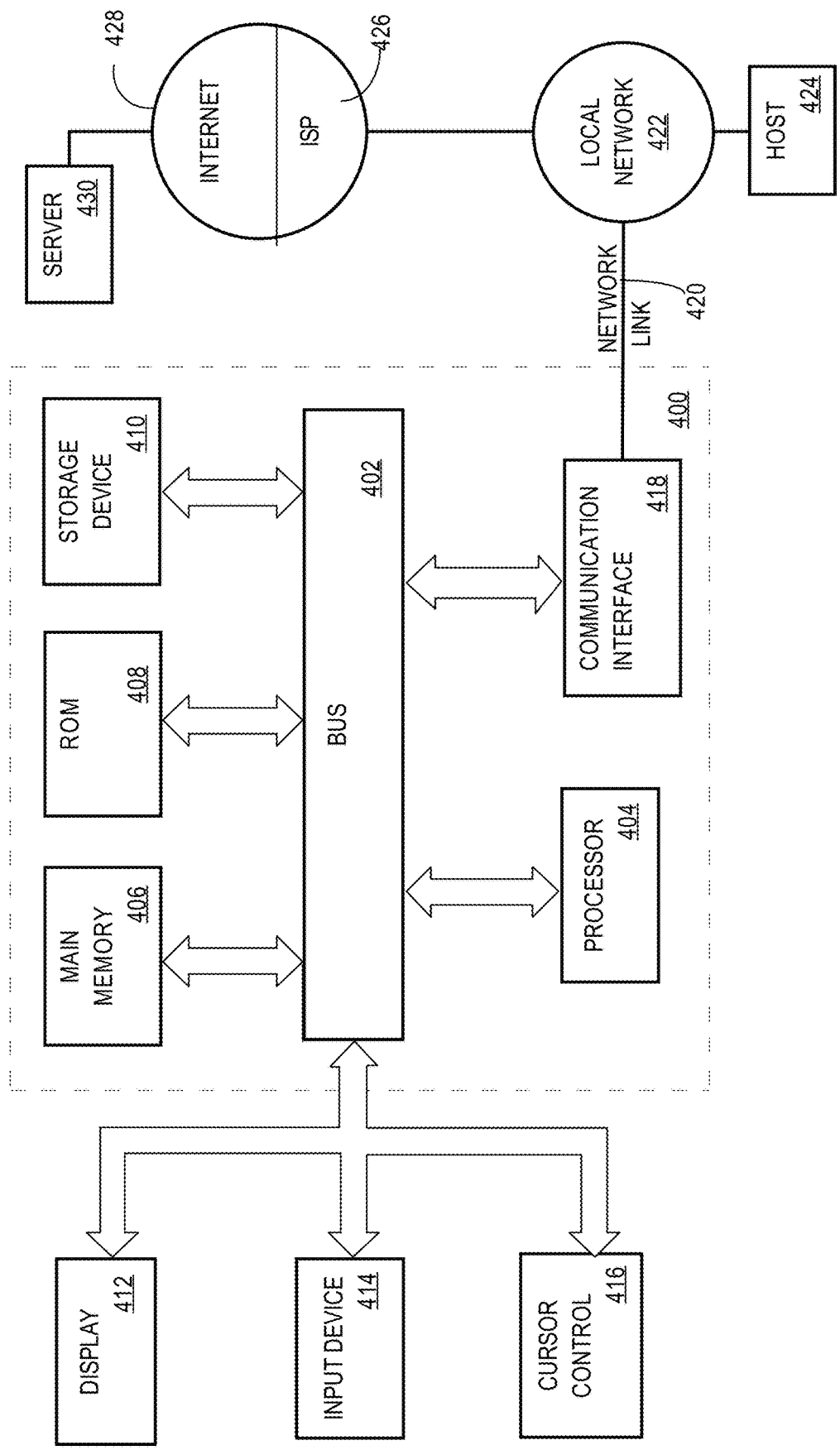
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disPlk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No.

62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
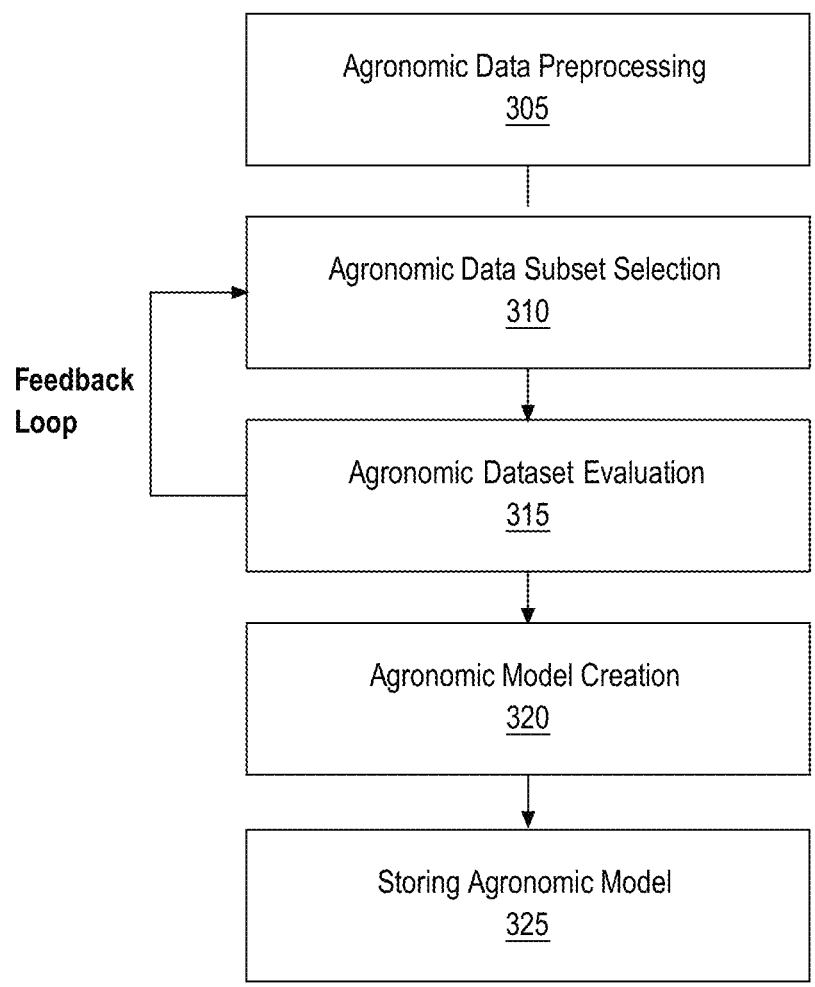
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Examples of Harvest Moisture Window Prediction

As an example, growers have determined from experience that the optimal time to harvest corn (maize) is when kernel moisture content is between 20% to 25% by weight. At moisture values greater than or less than the 20%-25% range, losses will occur that impact overall yield and therefore profit. Examples of loss effects that occur at moisture less than 20% include increased lodging and ear drop, as well as mechanical problems in combines or harvesters. Phantom yield loss occurs when plants lose dry matter in the form of volatile, evaporated compounds by expending excess energy to continue living longer than necessary. At moisture above 25%, incomplete ear filling occurs below growth stage R6 in which ears do not reach full potential, and higher drying costs are experienced. However, in the state of the art, assessing the readiness of a crop or field for harvest is based largely on instinct informed by moisture values obtained from a handful of kernel samples that represent a small fraction of a field.

In embodiments, a data analytics model is programmed to predict when particular hybrids planted in particular fields at particular locations will reach a moisture content of 20%-25% with a high degree of accuracy and confidence. While 20%-25% is a common range of values, other embodiments may train machine learning models to predict moisture at other values or ranges. Furthermore, the model may be augmented with predictive techniques that identify specific ranges of calendar dates on which harvest is ideal and losses are mitigated.

The output of the model can be transmitted as input to an operations research model that can further optimize all harvesting operations across all fields in a grower's operation.

Consequently, embodiments provide computer-implemented tools that can generate a tailored plan for a particular grower to optimize harvest operations. Embodiments can be used to direct the movement and placement of combines or harvesters in specific fields.

In an embodiment, an as-experienced relative maturity (AERM) model uses in-season weather data, hybrid or product data, and actual past planting data to generate output specifying a time window during which harvest is expected to be ideal and losses are mitigated.

Figure 7A:
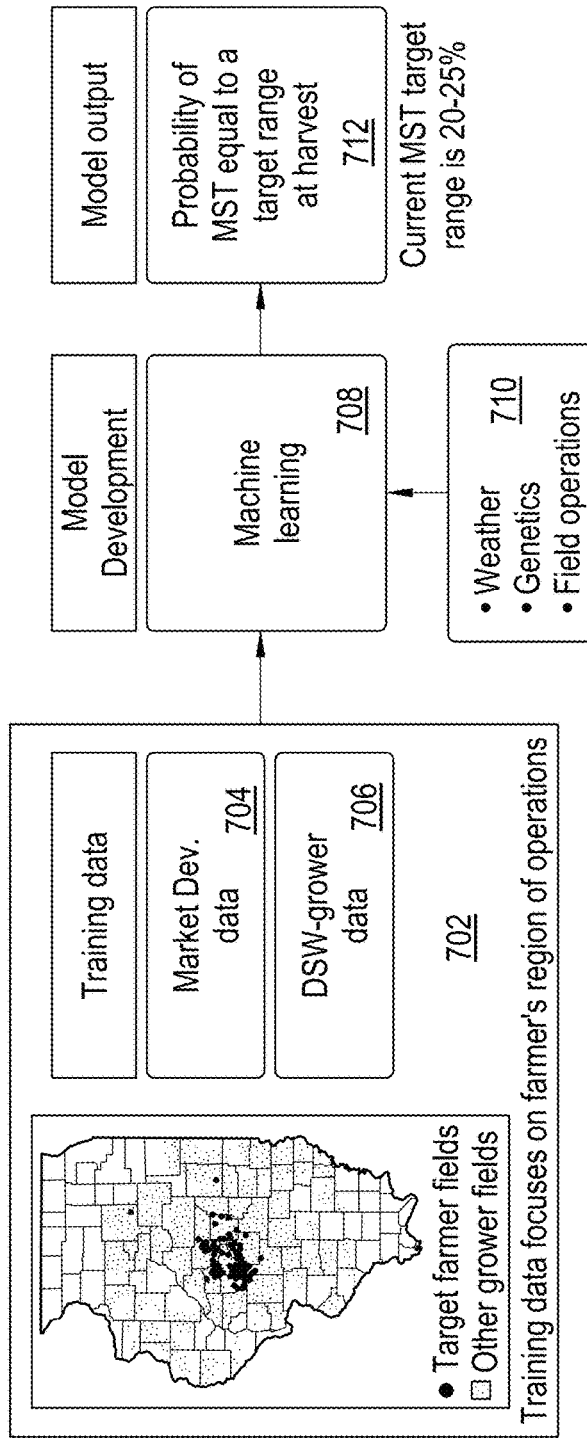
FIG. 7A illustrates a data flow in a distributed computer system that may be used as a basis of programming a process of predicting crop moisture content.

FIG. 7A illustrates a data flow in a distributed computer system that may be used as a basis of programming a process of predicting crop moisture content.

In an embodiment, training data 702 is transmitted as input to train a computer-implemented machine learning model 708. After training, in an evaluation phase, the machine learning model is programmed to receive other input data 710 and to generate an output probability dataset 712.

In an embodiment, training data 702 comprises market development data 704 and grower data 706. Grower data 706 may comprise historical data about actual planting dates, harvesting dates, and kernel or seed moisture content at specified harvesting dates as well as field geo-location data. For example, grower data 706 may specify that a specified corn hybrid was planted on a certain date, harvested on a certain date, yielded kernels with average moisture content of 22%, and occurred in a field with a centroid of specified latitude-longitude values. Thus, training data 702 may include actual kernel moisture values that are as-experienced at harvest on particular dates for specified fields at specified locations. This data may be correlated with weather data for further training enrichment. This data may be collected from dozens or hundreds of fields to yield thousands of data points for training.

The market development data 704 may contain the same kinds of values but may come from fields that are used by a manufacturer or vendor of seed or hybrids as part of research and market development activities, for example. Market development data 704 may comprise data about seeds or hybrids such as typical days to maturity or growth stages. Typically market development data 704 is for fewer hybrids than grower data 706, but is a large set of data values for those fewer hybrids. The use of such market development data 704 is optional and not required to be used by parties that do not have such development operations. In some embodiments, data values represent in-season R6 growth stage ground-truth data collected just prior to harvest.

Furthermore, in some embodiments, training data 702 may comprise scientific data about the date at which specified growth stages of a hybrid are reached. For example, for corn (maize), crop growth is commonly classified into phenology stages denoted VE, V1, V3, V7, V10, VT, R1 and R6. For any given hybrid, the average number of days, from germination to each stage, typically is known from research and experimentation. These data values, correlated to or including harvest window ranges, may form part of the training data 702. Phenology data in training data 702 also may specify, for each hybrid of a plurality of hybrids, a black layer date, R6 stage date, and number of days from R6 to harvest, the latter being recommended or ideal based on research experience.

In some embodiments, machine learning model 708 comprises a trained neural network, classifier or linear regression model that is implemented using Google TensorFlow as a foundation with application-specific configuration data. Training may use random forest approaches, or gradient boosting using the XGboost open source library, for example.

For the evaluation phase, the other input data 710 may comprises historic or recent weather data, genetics data for the hybrids represented in the grower data 706 or for a prospective field, field operations data for the fields represented in grower data 706 or other fields, and so forth. Weather data may specify AERM values, evapotranspiration values, equilibrium moisture content values, and/or precipitation values, correlated to geo-location values and/or field centroid location values. Field operations data may comprise actual or projected planting date and harvest date. Genetics data may comprise relative maturity values in terms of days after germination. The other input data 710 may represent current conditions or proposed values that a grower plans to use. Weather data may comprise projected weather data based on last observation dates and forecast dates and may be obtained from a commercially available or publicly available service that provides digital weather data.

Output dataset 712 provides a probability of moisture content in a crop equal to a target range at a particular harvest date. For example, output dataset 712 may specify that at "105" days from planting, as a harvest date, corn kernel moisture content has an 80% probability of being 22%. Output dataset 712 may comprise a plurality of values for different predicted moisture content values from 1% to 99% or for some other practical range such as 12% to 32%.

Figure 7B:
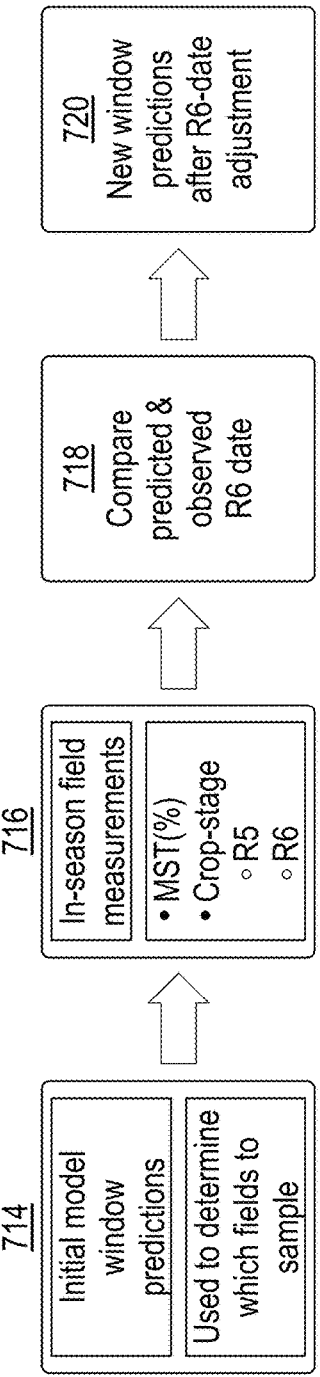
FIG. 7B illustrates a feedback data flow that may be used in some embodiments to improve output of FIG. 7A during a growing season.

FIG. 7B illustrates a feedback data flow that may be used in some embodiments to improve output of FIG. 7A during a growing season. In some embodiments, other data 710 may be received at the time that a particular grower has started harvest activities, and the machine learning model 708 may be executed at that time to provide an updated output dataset 712. Thus, in some embodiments, the data flow of FIG. 7A may be repeatedly executed at the same time that harvesting is occurring for one or more growers and thus may provide "real-time" results to growers to enable modifying or updating the movement of machinery or the start or end of harvesting for particular fields. In other embodiments, machine learning model 708 may be executed once per grower during the season to provide a one-time recommendation for harvest dates for all fields of that grower. For example, the machine learning model 708 could be executed at a late-season point, such as the first week of August, to generate recommendations of when to begin harvesting at a time that is approximately one month earlier than the earliest typical first harvest week for a particular geography. One month is specified here as an example and other embodiments may use earlier or later timing.

In an embodiment, model output 712 (FIG. 7A) is further transformed to yield initial model predictions 714 (FIG. 7B) as a set of dates during which harvest is predicted to occur at kernel moisture content of 20% to 25% by volume. The initial model predictions 714 are used to determine which fields to sample for actual kernel moisture content. In-season field measurements 716 are obtained from those fields and may include actual moisture values and crop-stage values indicating the stage of crops for which samples were obtained. In-season field measurements 716 may be received at any stage in a growing season including after harvesting starts. In some cases, in-season field measurements 716 may indicate that the crop has reached growth stage R6. Therefore, in an embodiment, a computer implementing aspects of FIG. 7A, FIG. 7B may be programmed to compare the predicted values and the actual observed R6 date, from in-season measurements 716, at block 718 to yield new window predictions 720 for after the R6 date. This data may be fed back into the machine learning model 708 as an additional component of training.

The use of geolocation data in training and evaluation enables the present techniques to account for geographic variability in harvest date.

Embodiments are useful, for example, in large agriculture operations in which the placement and movement of agricultural equipment are significant issues. An example harvesting operation could include 60 working days of harvest, 3 combines in the same field, 100 acres covered per combine per day, 3 tractors with grain cards and 16 sixteen-wheel tractor-trailer rigs moving seed to a drier or storage house. In operations of this size, predicting the correct harvest window adds significant value to the operations. In some embodiments, the computer-implemented techniques herein may be used to predict harvest time windows for a plurality of different fields each having a different geo-location value. Then, the geo-location values of different fields may be provided as input to a movement prediction algorithm to generate recommendations of an order of harvest that optimizes the predicted optimal dates of harvest and the location of fields to provide efficient paths for movement of equipment from one field to another. In some cases, balancing moisture content and the idea harvesting time window against location may suggest dividing inventories of equipment for a given week or day and moving a first portion of equipment to a closer field that has less optimal moisture content and a second portion of equipment to a further field that has more optimal moisture content.

In some embodiments, other parameter values may be used in training and evaluation, including field elevation; soil texture such as texture class, percent sand, percent clay; soil water features; distance and angular orientation to the closest nature water source; regional frequency of normal precipitation, severe drought and severe precipitation; product dry-down rate; and/or field slope or topography.

Figure 7C:
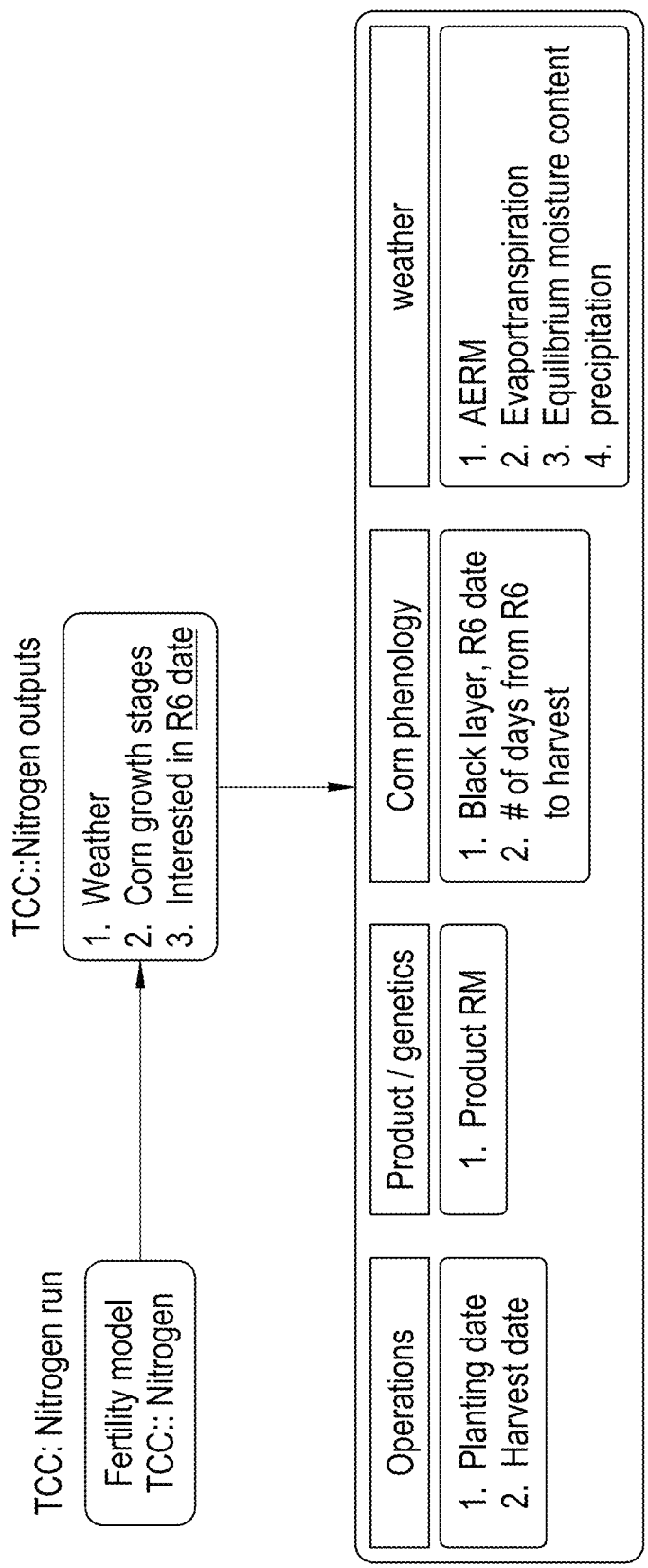
FIG. 7C illustrates data flows in computer-implemented embodiments that use a fertility model as a tool to obtain certain data for training the machine learning model of FIG. 7A.

FIG. 7C illustrates data flows in computer-implemented embodiments that use a fertility model as a tool to obtain certain data for training the machine learning model of FIG. 7A. In some embodiments, data and predictive features for training the machine learning model 708 may be obtained by accessing an executing instance of Nitrogen Advisor, commercially available from The Climate Corporation, using API calls issued from a computer that has been programmed with the functional elements of FIG. 7A. For example, Nitrogen Advisor may be called to execute a fertility model to produce as outputs weather data and corn growth stage data. Operations data, product/genetics data, corn phenology data including R6 date, which is key to harvest, and weather data all may be obtained as output from such API calls. This approach may be used as an alternative to the transmission of programmatic calls to a digital weather data service directly as it produces corn phenology data including R6 dates, which indicate maturity. Growth after R6 typically is confined to dry-down, which is less relevant to determining harvest date. Thus, any date after the R6 date is a potential harvest date.

Figure 7D:
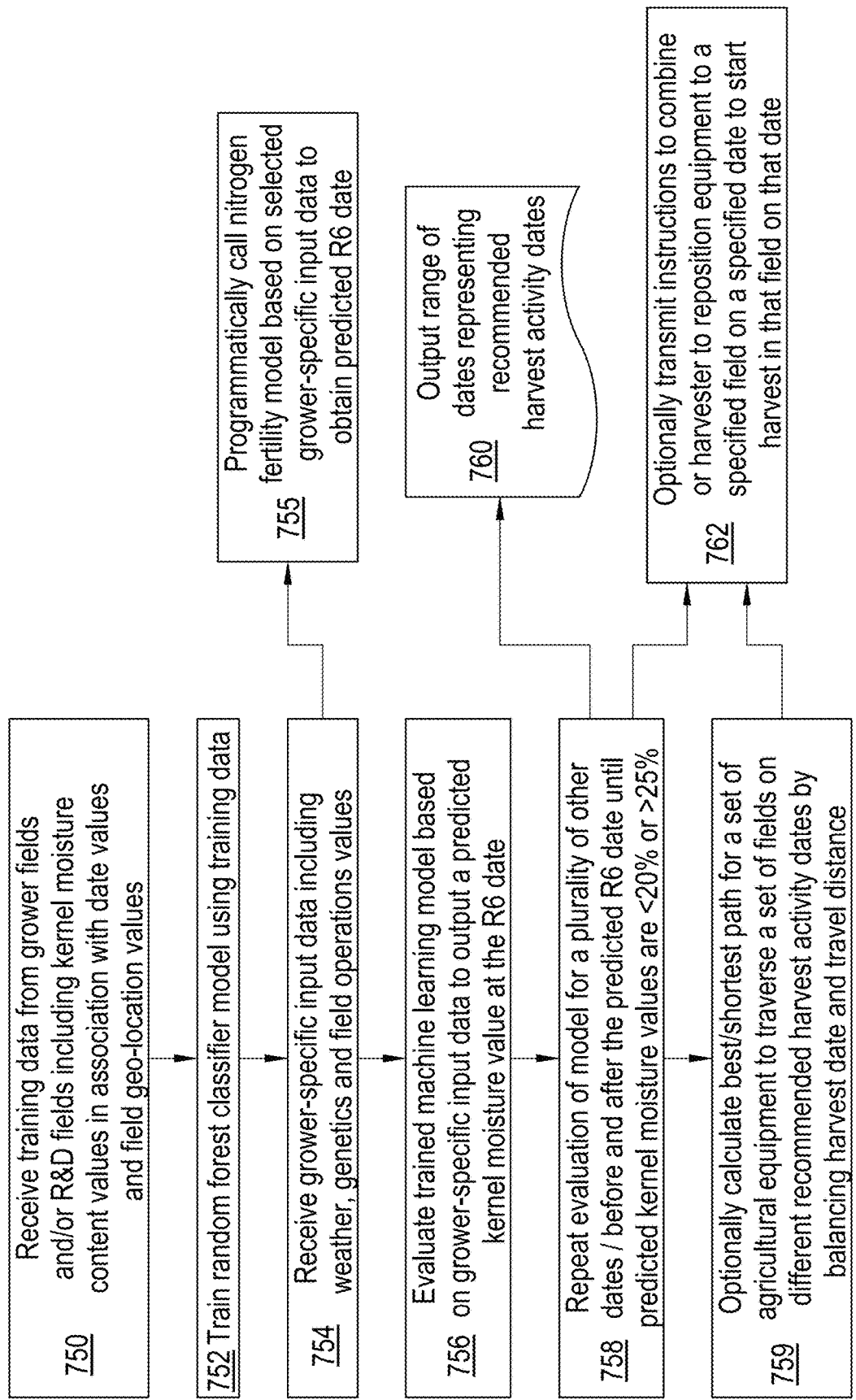
FIG. 7D illustrates a process of generating a set of date values for which harvest is recommended, according to an embodiment.

FIG. 7D illustrates a process of generating a set of date values for which harvest is recommended, according to an embodiment.

At block 750, the process receives training data from grower fields and/or research and development fields, including kernel moisture content values that are digitally stored in association with date values on which the moisture content values were obtained, and field geo-location values for fields from which the moisture content values were obtained. All such data may be digitally stored in a database such as the database of FIG. 1. At block 752, a random forest classifier machine learning model is trained using the training data.

At block 754, the process receives grower-specific input data including weather, genetics, and field operations values of the type previously described in this section. Optionally, at block 755, the process programmatically calls a fertility model process to obtain a predicted date at which the crop represented in the genetics values will reach the R6 growth stage based on the weather values and field operations values.

At block 756, the process evaluates the trained machine learning model based on grower-specific input data to output a predicted kernel moisture value at the R6 date that was obtained via block 755.

At block 758, the evaluation of block 756 is repeated for a plurality of other dates before and after the predicted R6 date until the output predicted moisture values are less than 20% or greater than 25%, for one embodiment. The result is a range of dates during which kernel moisture content is predicted to fall within the range 20% to 25%. Other ranges and/or tolerances outside the range 20% to 25% may be used.

At block 759, optionally the process calculates a best path or shortest path for a set of agricultural equipment to traverse a set of fields on different recommended harvest activity dates by balancing harvest date and travel distance. Block 759 may use the range of dates obtained via block 758 and could use the traveling salesman algorithm applied strictly to yield a shortest path among fields represented in the date values, even if equipment at a field on those dates will be harvesting crops with kernel moisture outside the range 20% to 25%. Or, block 759 may use an optimization function to balance distance traveled against the dates on which moisture is predicted to be within the range 20% to 25%.

At block 760, the process outputs the range of the dates that were obtained via block 758, which represent recommended harvest activity dates for specified fields and hybrids. Output at block 760 may comprise a printed report, text in a computer display unit, bar charts or graphs in a graphical user interface of the type described for FIG. 1, or output to cab computers in agricultural equipment.

At block 762, after either block 758 or block 759, the process may transmit instructions to a combine or harvester to cause repositioning that equipment to a specified field on a specified date to start harvest in that field on that date. Instructions transmitted at block 762 may occur wirelessly over network links to a cab computer of the equipment that is capable of driving the equipment to a field. Or, the instructions may cause displaying movement instructions in an in-cab digital display unit that is driven by a cab computer that receives the movement instructions.

Figure 8:
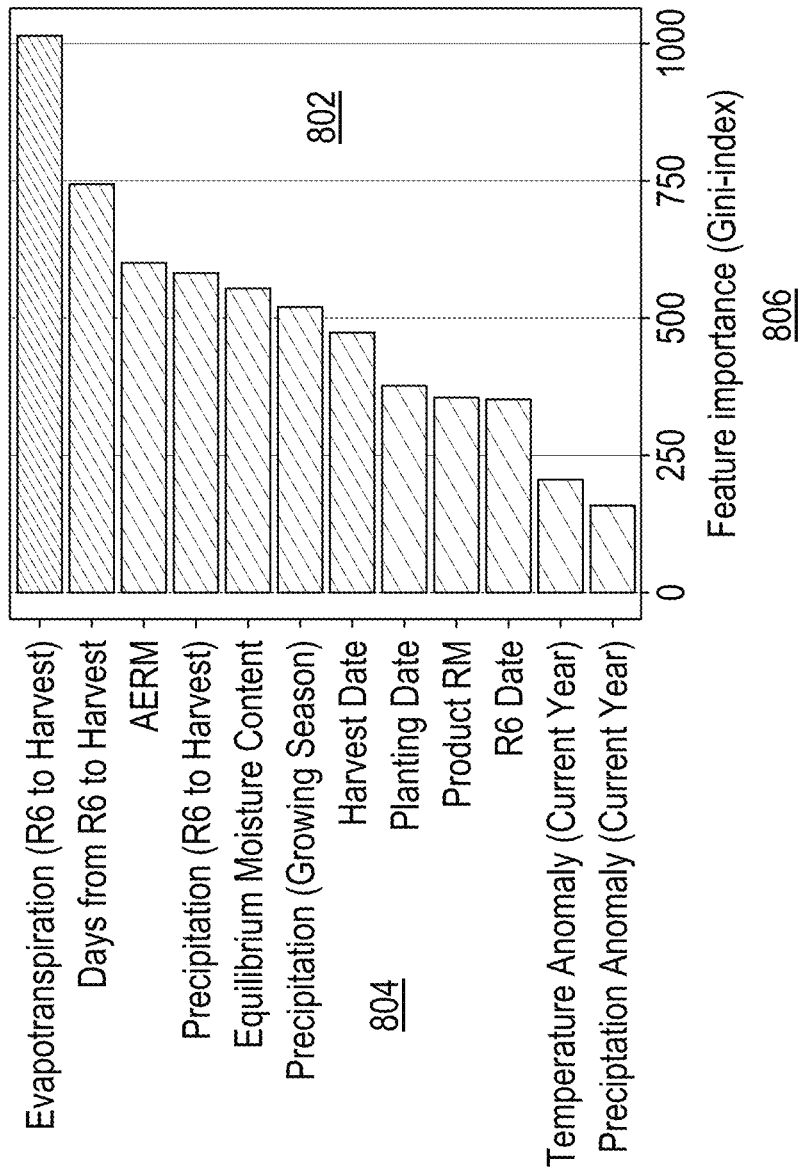
FIG. 8 illustrates the relative importance of features in training the machine learning model of FIG. 7A, based on a study of an actual machine learning model after training on thousands of data points of the types that have been specified.

FIG. 8 illustrates the relative importance of features in training the machine learning model of FIG. 7A, based on study of an actual machine learning model after training on thousands of data points of the types that have been specified.

In the example of FIG. 8, a bar chart 802 shows a plurality of features 804, which are identified in the Y-axis, against relative importance to a machine learning model, in the X-axis using Gini-index values 806. Each of the features shown in FIG. 8 may be represented in the training data 702 at the time of training, from any of the data sources that have been previously specified. In an embodiment, evapotranspiration values per field for hybrids from R6 stage date to harvest date have been identified as a predominant feature of importance in yielding accurate output datasets 712 from a machine learning model 708 that is trained as described for FIG. 7A. Other features of significance include days from R6 to harvest; AERM; precipitation from R6 to harvest; equilibrium moisture content; precipitation during growing season; harvest date; planting date; product relative maturity; R6 date for a hybrid; whether the current year represents a temperature anomaly compared to historic temperature records; and whether the present year represents a precipitation anomaly compared to historic precipitation records. The foregoing have been listed in descending order as actually experienced in evaluation of a trained machine learning model. The anomaly values do not need to be obtained on a per-field basis but can be obtained for climate divisions (for example, "Illinois East") or on a county, regional or state basis.

Figure 9:
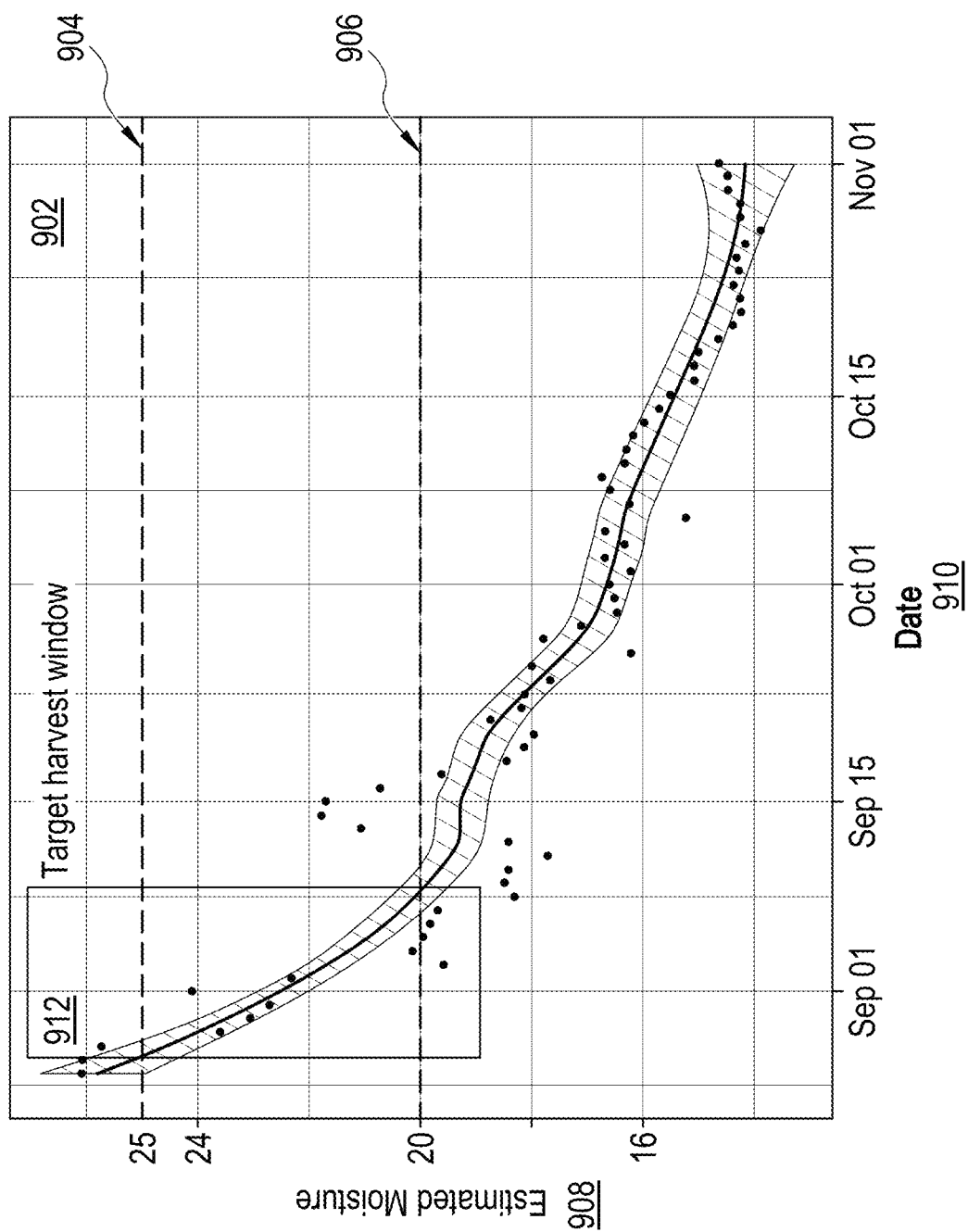
FIG. 9 illustrates a graph of example prediction output data that may be generated in an embodiment.

FIG. 9 illustrates a graph of example prediction output data that may be generated in an embodiment. The data of FIG. 9 is particular to a field, the product or hybrid 209-53STXRIB which has an RM value of 109, for a specified planting date. In the example of FIG. 9, graph 902 comprises boundary lines 904, 906 that correspond to estimated moisture values of 20% to 25%, as seen in axis 908. Predicted moisture values are represented as dots, each dot corresponding to a different calendar date along a date axis 910. A target harvest window 912 comprises a bounding box around all the estimated moisture values of about 20% to about 25% and therefore a lateral width of the window correlates to target harvest dates for approximately August 25 to September 8 in this example. Based on this data, computer interfaces may instruct specific harvesting equipment to move to a specified field to commence harvesting operations on the specified dates.

FIG. 10 illustrates example mathematical models that may be implemented in computer program implementations as the machine learning model of FIG. 7A. As seen in FIG. 10, machine learning model 708 (FIG. 7A) may be programmed as a linear regression model, or several different models based on differential equations. In one embodiment, the linear regression approach described in US Pat. Pub. No. 20170124463 (J R Chen et al.) may be used. The entire contents of US Pat. Pub. No. 20170124463 are hereby incorporated by reference for all purposes as if fully set forth herein. Each equation shown in FIG. 10 may be programmed in computer program instructions that form part of the machine learning model 708.

3.1 Example How Models

Short-Range HOW Model

In one example, the above-described techniques are used to generate an in-season harvest optimization window (HOW) model that seeks to optimize a grower's harvest by making short-range predictions of optimal harvest moisture windows. The in-season HOW model produces short-range (for example, daily) harvest moisture window predictions based on recently-observed data that is collected while the crop season is underway and before actual harvest. For example, inputs to the in-season HOW include known hybrid, known relative maturity (RM), observed planting date, observed weather data (up to the day of prediction), forecasted weather data (for example, 2 weeks ahead) and other crop and environment features In response to these inputs, the in-season HOW model outputs running harvest window predictions, that is, grain moisture level for a given hybrid in a given field on a set date. The in-season HOW model may ingest inputs and generate predictions in a periodic (for example, daily) manner until the system determines that all of the fields within a grower operation have been harvested. To determine which fields have or have not been harvested, the system can query the harvest date field of a database that stores the agricultural operation data, for example.

Long-Range HOW Model

In another example, the above-described techniques are used to generate pre-season harvest optimization window (HOW) model that seeks to optimize a grower's harvest by making long-range predictions of optimal harvest moisture windows; that is, predictions of grain moisture level for a given hybrid in a given field on a set date, for an upcoming growing season but before the growing season has started. The pre-season HOW model produces long-range (for example, 8-10 months in advance) harvest moisture window predictions that are based on historical data that has been collected during previous growing seasons.

The output of the pre-season HOW model can be used as input to a planting optimization window (POW) model, for example as one factor used to predict relative maturity optimization or planting date optimization. For example, a pre-season RM optimization function of a POW framework can use historic data for a grower's field (for example, data from the previous x years) to identify median planting dates and median harvest dates for a field, using a dominant weather scenario that has been predicted based on the historic data along with possible hybrid RM options that also have been derived from historic data for a particular field.

Output of the pre-season HOW model is a predicted harvest grain moisture for a range of hybrids per field for all hybrid-field combinations in a grower operation. This output may be fed into a hybrid portfolio model that optimizes a grower's hybrid RMs in the portfolio based on grower harvest capacity to increase yield and optimize harvest for each field, so that each hybrid has a higher likelihood of being harvested in an optimal harvest moisture window.

Examples of POW models are described in more detail in Section 4 below.

Both the short-range and long-range HOW models use similar inputs, which may include but are not necessarily limited to:

Planting date

Harvest date

Max Temperature

Min Temperature
Growing degree days
Evapotranspiration
Precipitation
Wind
Solar Radiation
As experienced relative maturity (AERM)
Average Relative Humidity
Relative maturity (RM)
RM distribution
Soil Texture class
Wilting point
Field capacity
Sand percent
Plant Available Water
Distance from stream
Stream angle
Elevation
Drought risk class.

After implementation for grower fields, the HOW models and algorithms can continue to be fine-tuned based on the results of the previous set of predictions.

4. Example Generation of Digital Plan

4.1 Process Overview

Figure 11B:
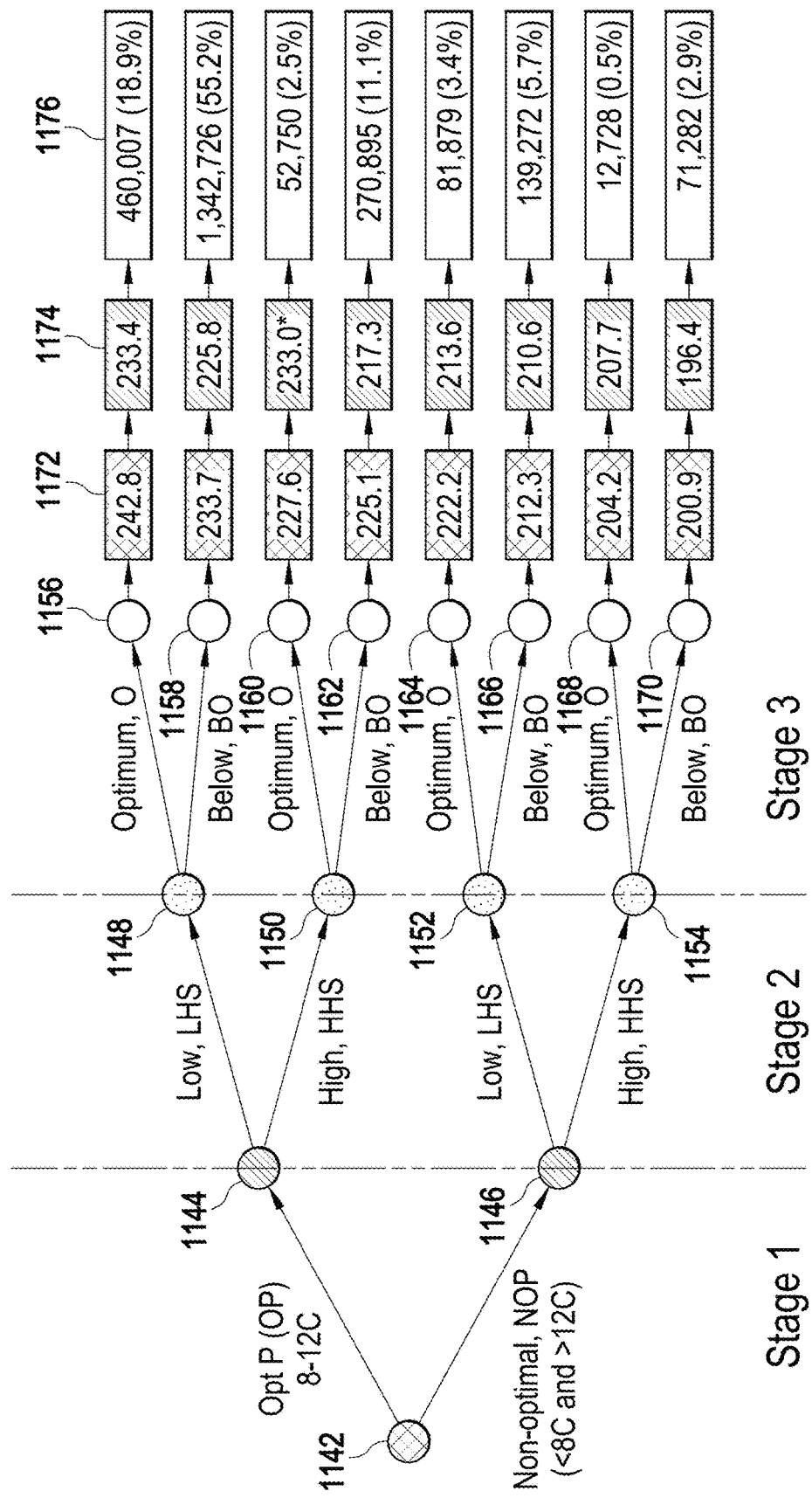
FIG. 11(b) illustrates an example predictive model.

FIG. 11(a) illustrates a programmed process by which the agricultural intelligence computer system implements planting plan instructions 136 to use one or more predictive models to generate and/or modify digital planting plans using field data provided by one or more data sources. Digital planting plans generated using the disclosed technologies include optimized product relative maturities and/or optimized product planting times, where the product maturities and/or planting times are configured with a goal of maximizing yield and/or minimizing stress, where harvest moisture is used as an indicator of stress.

FIG. 11(a) may serve as an algorithm or instructions for programming the functional elements of the agricultural intelligence computer system 130 to perform the operations that are now described. Aspects of the process of FIG. 11(a), such as data generation, pre-processing, and model creation may incorporate one or more of the approaches described above with reference to FIG. 3, in some embodiments.

In operation 1105, the agricultural intelligence computer system 130 is configured or programmed to receive or extract field data from one or more data sources, such as model and field data repository 160, using electronic communication, and preprocess the field data as needed using, for example, one or more preprocessing techniques described above with reference to FIG. 3. The field data received or extracted from one or more data sources in operation 1105 includes field and product data 1102 and stress risk data 1104. In an embodiment, field and product data 1102 indicates assignments of products to fields that have been made historically over a recent previous period of years or growing seasons of a grower's agricultural operation. An example data record specification that includes field and product data 1102 is shown in Table 1 below. Field ID is a unique identifier for a field of a grower's agricultural operation, while acreage, boundaries, and product relative maturity are data that are associated with the identified field.

TABLE

| Example Field and Product Data Record. | | | |
|---|---|---|---|
| Field ID | Acreage | Boundaries | Product relative maturity (RM) |

The field data received in operation 1105 also includes stress risk data 1104. In an embodiment, stress risk data 1104 indicates measurements of certain weather, environmental, and/or operational conditions that have occurred historically over a recent previous period of years or growing seasons for particular fields of a grower's agricultural operation. In an embodiment, stress risk data 1104 includes data collected during multiple different stages of a grower's agricultural operation with respect to particular product and field combinations.

The stages of an agricultural operation include, for example: pre-planting, post-planting, early season, flowering, pre-harvest, and harvest. In an embodiment, the disclosed technologies generate static planting plans and dynamically update the static plans during various stages of the growing season. Alternatively or in addition, stress risk data 1104 is classified according to the planning stage in which the particular stress risk data is used to influence the planting plan, for example: static, dynamic, either static or dynamic, or both static and dynamic. An example of stress risk data classified by stage of agricultural operation and by planning stage is shown in Table 2 below.

TABLE 2

| Example Stress Risk Data Classifications. | | | | | | |
|---|---|---|---|---|---|---|
| | Pre-Planting | Post-Planting | Early Season | Flowering | Pre-Harvest | Harvest |
| Static Planning | Soil temperature Insurance cutoff Product RM-aeRM match | Late spring frost date | | Heat stress | First fall frost date | Harvest moisture |
| Dynamic Planning | Field Readiness Ponding | Ponding | Emergence | | | |
| Static and/or Dynamic | | | | Drought Stress Disease/Pest risk | Standability | |

Classification of stress risk data 1104 by operational stage allows weights to be assigned to the different stress risks and adjusted during the growing season. For instance, as the growing season enters the flowering stage, a weight assigned to heat stress may be increased while a weight assigned to the spring frost date may be decreased.

Classification of stress risk data 1104 by planning stage allows weights to be assigned to the different stress risks and adjusted based on the stage of planting plan generation or modification. For example, during generation of a static planting plan, a weight of zero may be assigned to those stress risks that tend to be highly variable or less predictable during the growing season, such as ponding. Similarly, during dynamic adjustment of a planting plan, the weight assigned to ponding may be increased while a weight of zero may be assigned to those stress risks that are static or which are only relevant at the pre-planting stage.

An example data record specification that includes stress risk data 1104 is shown in Table 3 below. Field ID is a unique identifier for a field of a grower's agricultural operation, while product RM, planting date, soil temperature, heat stress, and harvest moisture are stress risk data that are associated with the identified field.

TABLE 3

Example Stress Risk Data Record.

| Field ID | Product RM | Planting Date | Soil Temperature | Heat Stress | Harvest Moisture |
|---|---|---|---|---|---|

Field and product data 1102 and stress risk data 1104 may be received or extracted from the same data source or different data sources. Operation 1105 processes the received or extracted data records and generates and outputs a set of field-product scenarios 1108. In an embodiment, a field-product scenario 1108 is a data record that indicates longitudinal data for a particular growing season of a particular field in which a particular product RM has been planted. As such, a field-product scenario 1108 includes a combination of field and product data 1102 and stress risk data 1104 as well as harvest data such as actual yield measured at harvest and as-experienced product RM (aeRM) at harvest. An example data record specification for a field-product scenario 1108 is shown in Table 4 below. The combination of field ID and product RM uniquely identify the field-product scenario 1108. Planting date, soil temperature, heat stress, and harvest data including harvest date, harvest moisture, aeRM and yield, are data associated with the particular field ID and product RM combination.

TABLE 4

Example Field-Product Scenario.

| Field ID | Product RM | Planting Date | Soil Temperature | Heat Stress | Harvest Date | Harvest Moisture | aeRM | Yield |
|---|---|---|---|---|---|---|---|---|

In operation 1110, the field-product scenarios 1108 generated by operation 1105 are classified using predictive threshold(s) 1106. Predictive threshold(s) 1106 indicate one or more criteria, such as minimum and/or maximum values or ranges of values, which are associated with desirable harvest outcomes. Predictive threshold(s) 1106 are determined based on empirical research, for example. Examples of predictive thresholds and stage-variable weights associated with the predictive thresholds are shown in Table 5 below.

TABLE 5

Example Predictive Thresholds.

| Stress risk | Threshold | W1 (represents impact on planting plan) | W2 (represents impact on harvest plan) |
|---|---|---|---|
| Planting temperature | Greater than 6 degrees Celsius | 2 | 1 |
| Heat stress | Less than 50% | .5 | .5 |
| Harvest moisture | Between 20 and 25 | 1 | 2 |
| Ponding | Less than 60% | 3 | 1 |
| Precipitation in last 2 days | <0.6 inches | 3 | 1 |
| aeRM risk | Less than 50% | 1 | 1 |
| Spring frost event | Less than 50% | 2 | 1 |
| Soil moisture | Less than 0% of field capacity | 3 | 0 |

In an embodiment, predictive thresholds 1106 are incorporated into a tree-based learning process to classify field-product scenarios 1108. An example of such tree-based classification process is shown in FIG. 11(*b*) and described in more detail below. Examples of algorithms that can be used to implement the learning process include random forest and boosting algorithms.

Output of the described classification processes is used by operation 1110 to select candidate field-product scenario(s) 1116 for further analysis and potential optimization. Candidate field-product scenario(s) 1116 is a subset of field-product scenarios 1108 that contains field-product scenarios that are candidates for further analysis. For example, field-product scenarios 1108 that resulted in a desired yield at a desired harvest moisture would likely be excluded from the candidate field-product scenario(s) 1116, while field-product scenarios 1108 that resulted in less than the desired yield or harvest moisture would likely be included in the candidate field-product scenario(s) 1116.

Predictive thresholds 1106 also are used by risk score computation operation 1120 to generate one or more scenario-specific risk scores. In an embodiment, operation 1120 computes multiple different risk scores, where each risk score corresponds to a specific optimization parameter. In the disclosed embodiments, the optimization parameters include yield, harvest moisture, and field readiness for planting, with yield and harvest moisture being the optimization parameters for the static planting plan and field readiness being the optimization parameter for the dynamic planting plan.

Operation 1120 computes a yield risk score by comparing product RM to aeRM for a particular candidate field-product scenario, where product RM is the product relative maturity at planting time, as specified by a product manufacturer, for example. If aeRM is greater than product RM, it may be inferred that the particular field environment can support longer product RMs. If a longer product RM is used in a field that can support a longer relative maturity, the likelihood of a higher yield is increased. Thus, operation 1120 outputs a yield risk score that reflects the opportunity to adjust the product maturity that is assigned to the field, in order to increase yield.

Operation 1120 computes a harvest moisture risk score for a particular candidate field-product scenario using the machine learning-based approach described in Part 3 above. Given a particular candidate field-product scenario 1116, the harvest moisture risk score output by operation 1120 indicates a likelihood that the product maturity assigned to the product-field scenario will be harvested when its moisture is within a desired moisture range. If the harvest moisture risk score indicates a high likelihood that a product having the assigned product maturity will not be harvested when its moisture is within a desired moisture range, the likelihood of yield being reduced due to non-optimal harvest moisture is higher. Thus, operation 1120 outputs a harvest moisture risk score that reflects the opportunity to adjust the product maturity that is assigned to the field, in order to protect yield. The field readiness risk score is computed by operation 1130, dynamic adaptation, described below. Operation 1120 outputs the scenario-risk score(s) 1122, which are associated with the corresponding candidate field-product scenarios 1116. Operation 1120 cooperates with operation 1110 to iteratively compute risk scores for individual candidate field-product scenarios 1116.

Operation 1125 receives the scenario-risk score(s) 1122 for the candidate field-product scenarios 1116 and adjusts the planting plan based on these risk score(s). If a scenario-risk score 1122 exceeds a risk threshold for a particular candidate field-product scenario, operation 1125 uses an optimization algorithm to adjust a parameter of the particular candidate field-product scenario to improve the risk score. In an embodiment, operation 1125 changes the product RM assigned to the field if the yield risk score indicates that aeRM>product RM and/or if the harvest moisture risk score indicates that the product's predicted moisture as measured at harvest is likely to be outside the desired range. For example, operation 1125 iteratively increases the product RM until an optimal combination of aeRM and predicted harvest moisture is achieved. In an embodiment, a linear programming optimization method, for example the Simplex method, is used to arrive at the optimal product RM adjustments. T The product RM adjustments made by operation 1125 may be made on a macro level, for example the allocation of product RMs across all fields of the grower's operation may be adjusted by changing the number of acres or the percentage of total acres assigned to particular product RMs. Alternatively or in addition, the product RM assigned to a particular field is adjusted. For example, a product RM of 110 may replace a product RM of 105 for a particular field.

Operation 1125 incorporates the product RM adjustment(s) into the planting plan and outputs digital planting plan 1126. Digital planting plan 1126 includes one or more digital visualizations of product maturity allocations for a particular field or for a number of fields of a grower's agricultural operation. The digital visualizations can include field-specific product RM allocations and/or distributions of product RMs across a number of fields or an entire agricultural operation. Planting plans are improved by operation 1125 because product RM adjustment(s) are made that are mathematically determined to be likely to improve yield and/or harvest moisture. The above-described process of improving a planting plan is illustrated by FIG. 12(*a*), FIG. 12(*b*) and FIG. 13, described below.

In operation 1130, digital planting plan 1126 is dynamically re-evaluated based on current weather forecast data 1128. In an embodiment, stress risk data that indicate field readiness, such as field workability data, are updated after a static planting plan is created and prior to a scheduled planting date. For example, operation 1130 may re-evaluate field readiness on a daily basis or as needed as a planting date approaches, based on changes in a weather forecast for the next two weeks, 10 days, or 24 hours.

Weather data that is measured and tracked for purposes of determining field workability include actual precipitation, soil water, soil temperature, and ponding. By observing the daily or periodic variations these factors as compared to historical weather data for the field, operation 1130 computes a field readiness risk score. In an embodiment, the field readiness risk score is a binary value where zero indicate that the field is not workable or ready for planting and one indicates that the field is workable.

When operation 1130 concludes that a field is not workable, operation 1130 uses the historical and current weather data to move the scheduled planting date to a date in which it is predicted that the field will be ready for planting. Operation 1130 may repeat this process of re-evaluating field readiness and adjusting planting date as new weather forecast data 1128 is received. The above-described process of dynamically adapting a planting plan based on field readiness is illustrated by FIG. 14(*b*) through FIG. 14(*e*), described below.

4.2 Classification Model Overview

FIG. 11(*b*) illustrates an example model 1140 that can be used to generate stress risk predictions. The model of FIG. 11(*b*) uses a tree-based graph structure in which nodes indicate data sets and edges indicate different predictive thresholds for different stress risks. The graph structure is divided into multiple sub-trees, where each sub-tree corresponds to a stage of the growing season (stage 1, stage 2, stage 3). The predictive thresholds that are assigned to the edges of a stage correspond to stress risks that are associated with that particular stage.

Node 1142 represents a data set, for example a set of field-product scenarios. Stage 1 corresponds to a planting stage in which the relevant stress risk is soil temperature. As such, the edges of stage 1 represent predictive thresholds for soil temperature. Thus, data set 1144 represents a subset of data set 1142 where the field-product scenarios matched the predictive threshold of soil temperature in the range of 8-12 degrees Celsius. Similarly, data set 1146 represents a subset of data set 1142 in which the field-product scenarios match the predictive threshold of soil temperature less than 8 degrees Celsius or greater than 12 degrees Celsius. The predictive thresholds are selected so that the data set 1142 can be divided into subsets without loss of data. That is, all of the field-product scenarios in data set 1142 have soil temperature either within the 8-12 degree Celsius range or outside of that range.

Similarly, stage 2 corresponds to a flowering stage in which the relevant stress risk is heat stress. Data sets 1144, 1146 are divided into subsets 1148, 1150, 1152, 1154 according to whether the heat stress recorded for a particular field-product scenario is low or high. Thus, each of data sets 1148, 1150, 1152, 1154 contains a subset of data set 1142 that satisfies a particular combination of predictive thresholds for soil temperature and heat stress.

Stage 3 corresponds to a harvest stage, in which the relevant stress risk is harvest moisture. Data sets 1148, 1150, 1152, 1154 are further divided into subsets 1156, 1158, 1160, 1162, 1164, 1166, 1168, 1170, according to whether the harvest moisture recorded for a particular field-product scenario is at or below a desired moisture range. Thus, each of data sets 1156, 1158, 1160, 1162, 1164, 1166, 1168, 1170 contains a subset of data set 1142 that satisfies a particular combination of predictive thresholds for soil temperature and heat stress and harvest moisture.

Columns 1172 and 1174 represent risk scores that were computed for two different data sets 1142, for each of the various combinations of predictive thresholds. Column 1176 indicates the amount and percentage of field acreage assigned to the various field-product scenarios in the data sets. Modeling data sets 1142 in this way enables the identification of field-product scenarios that are candidates for improving yield, and also identifies combinations of predictive thresholds that are associated with optimal and sub-optimal yield results. Model 1140 can thus be used to identify candidate field-product scenarios 1116 from a larger set of field-product scenarios 1108.

4.3 Use Case—Creation and Adjustment of Digital Plans

Example implementations of the technologies described above to create or modify digital planting plans are shown in FIG. 12(a), FIG. 12(b), FIG. 13, FIG. 14.

Figure 12A:
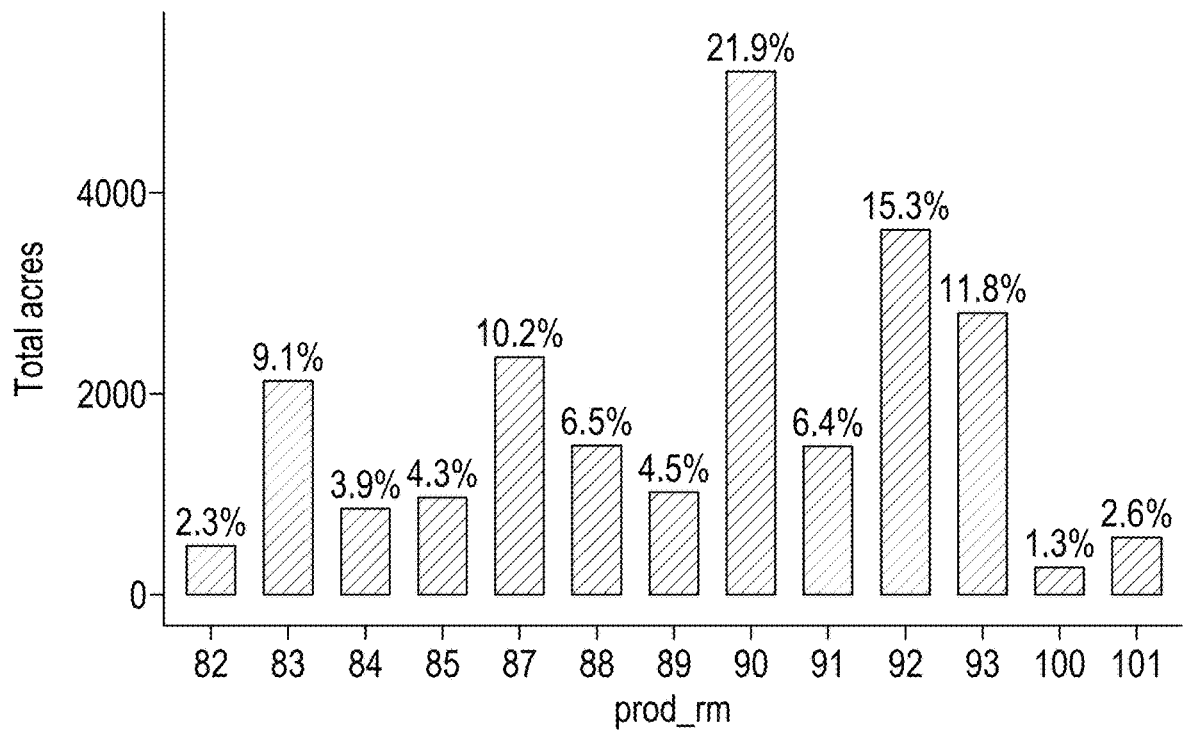
FIG. 12(a), FIG. 12(b) depict two views of an example digital planting plan.
Figure 12B:
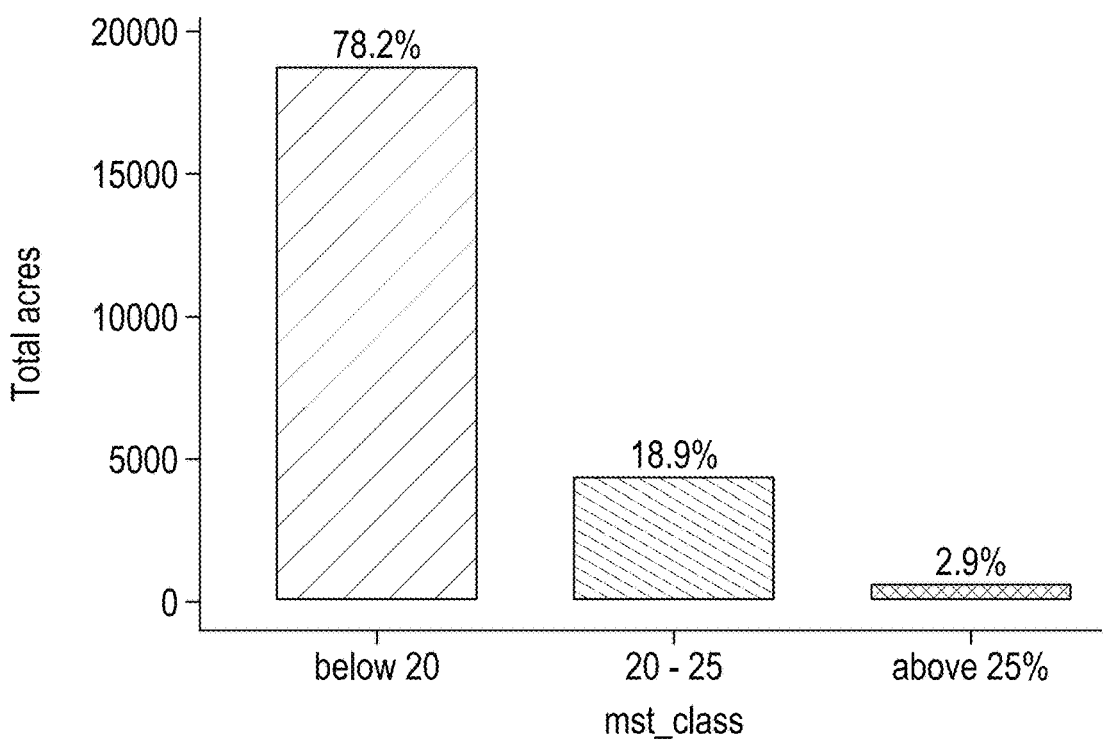

FIG. 12(a), FIG. 12(b) depicts two views of an example digital planting plan prior to application of the technologies described herein. In FIG. 12(a), an example plot shows an initial distribution of product RMs to field acreage at planting time. FIG. 12(b) is an example plot that shows the moisture levels measured at harvest for the product RMs of FIG. 12(a). As can be seen from FIG. 12(b), the moisture at harvest was below the desired moisture range for a large portion of the fields planted according to the planting plan of FIG. 12(a).

Figure 13A:
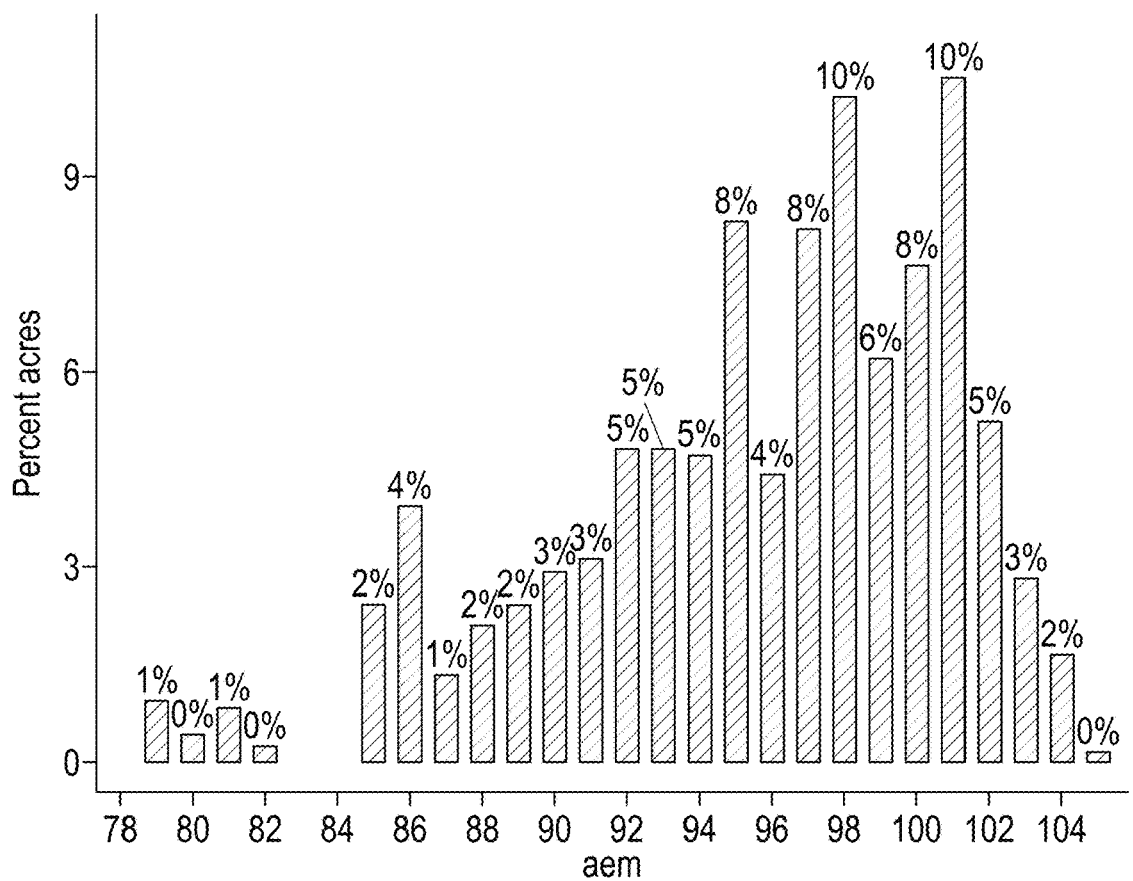
FIG. 13(a), FIG. 13(b), FIG. 13(c) depict several views of another example digital planting plan.
Figure 13B:
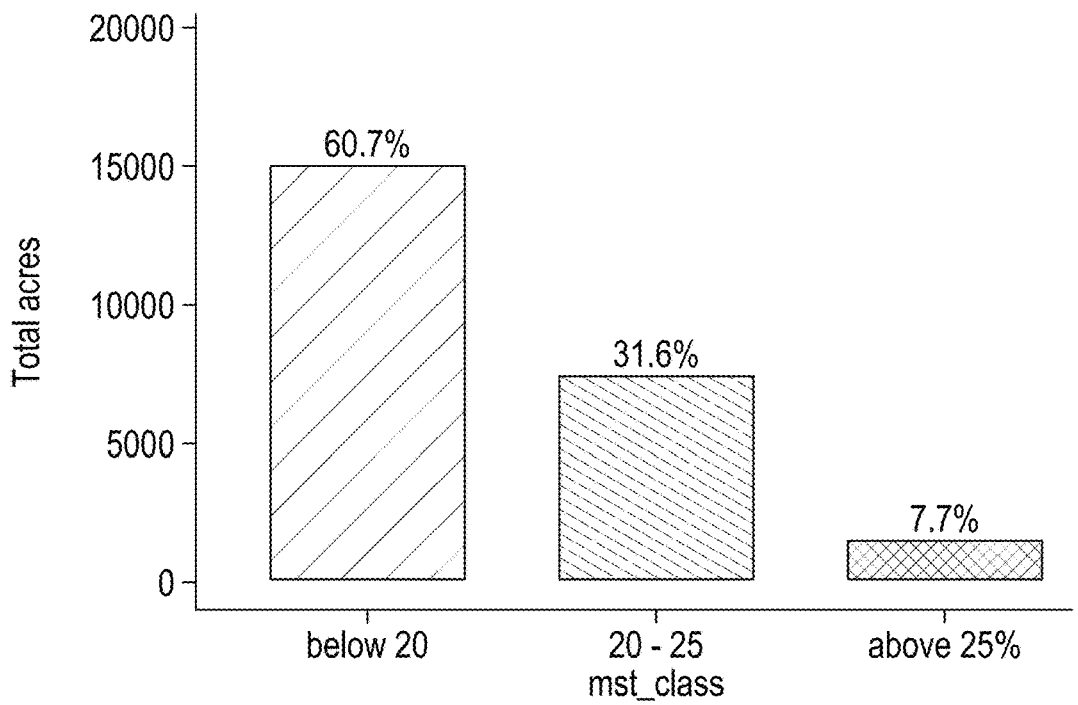
Figure 13C:
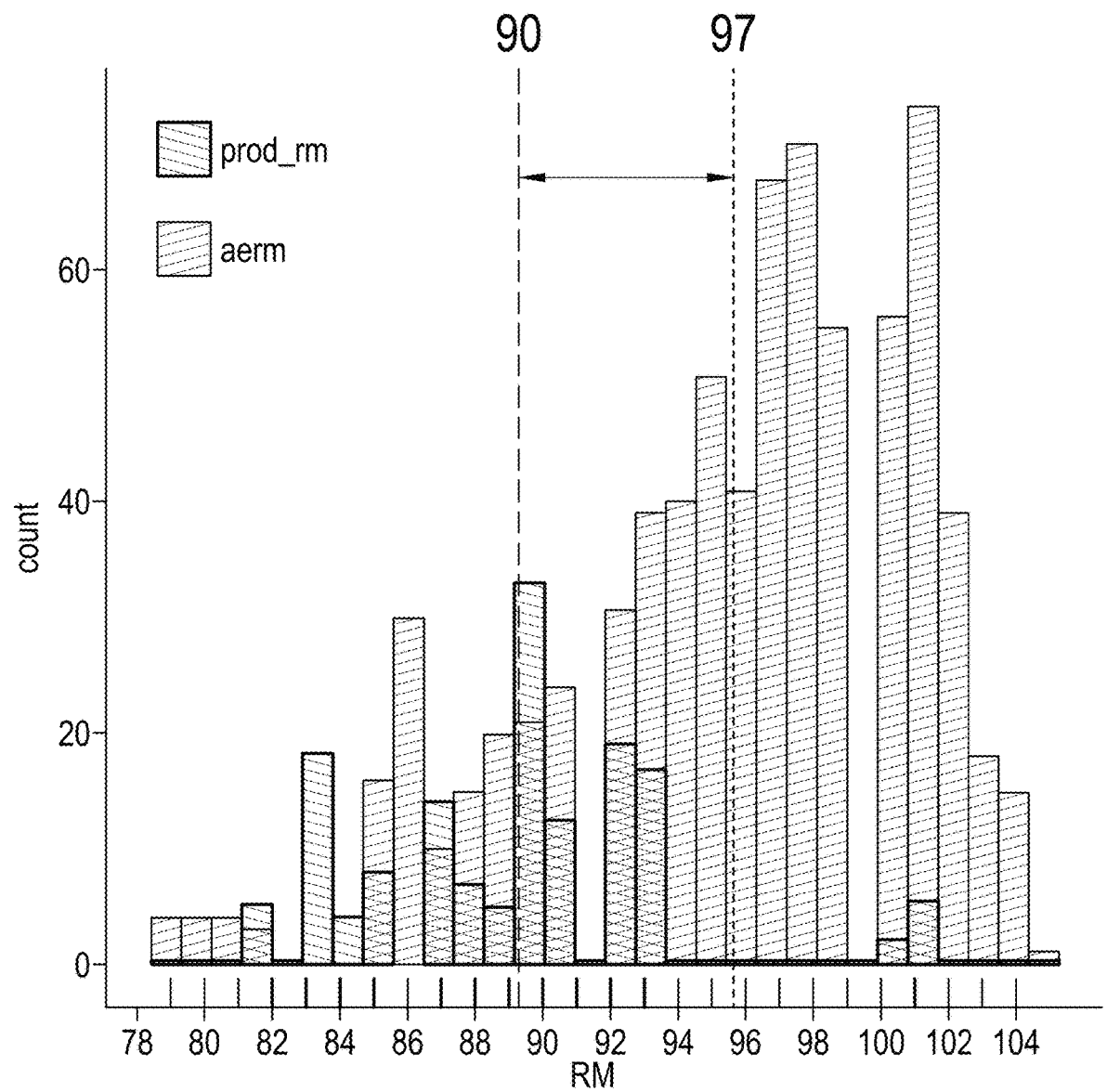

FIG. 13(a), FIG. 13(b), FIG. 13(c) depict several views of another example digital planting plan. FIG. 13(a) is an example plot that shows the as-experienced relative maturity at the time of harvest, for the fields planted according to the product RM distribution of FIG. 12(a), by percentage of total acreage. FIG. 13(a) suggests that the fields planted according to the RM distribution of FIG. 12(a) actually could support a different RM distribution in which longer product RMs are used on larger percentages of the fields.

FIG. 13(b) is an example plot that shows the predicted harvest moisture if the fields were to be planted with an RM distribution in accordance with FIG. 13(a) rather than using the RM distribution of FIG. 12(a). FIG. 13(c) illustrates the plot of FIG. 13(a) overlaid on a plot of an aeRM distribution that is similar to the distribution of FIG. 13(b) but using the same y-axis scale as FIG. 13(a). The distance between the medians of these two distributions represents an optimization opportunity. As shown by FIG. 13(c), it is predicted that adjusting the RM distribution toward the aeRM distribution is likely to improve the number of fields harvested with product that is in the desired moisture range.

Figure 14A:
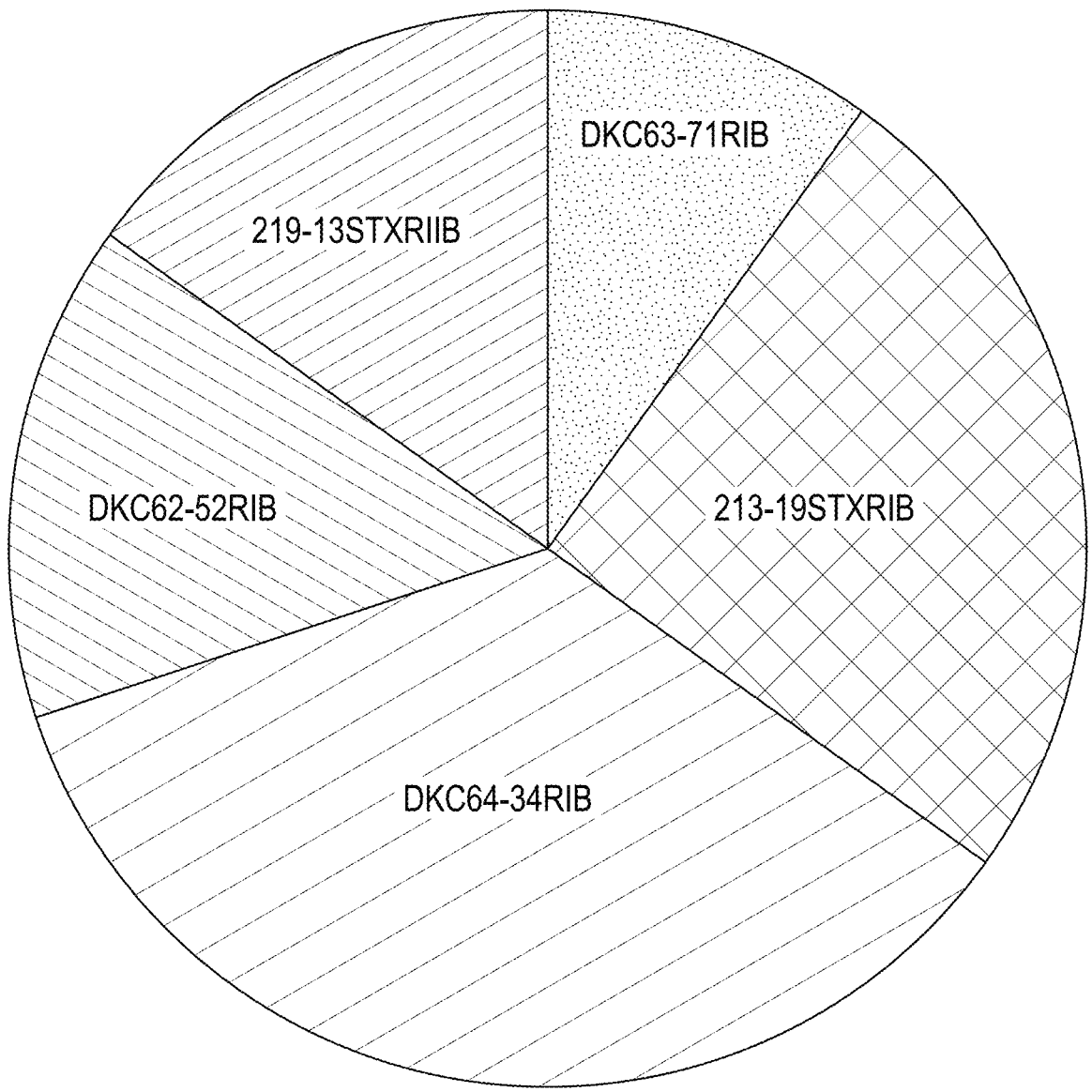

FIG. 14(a) shows an example plot of an RM distribution across a grower's entire agricultural operation, such that each portion of the pie chart represents a percentage of the total number of fields in the operation that are to be planted with a particular product RM. The pie chart of FIG. 14(a) is one type of output that may be produced by operation 1125 of FIG. 11(a). In an embodiment, a chart such as FIG. 14(a) is sent to a grower's computing device and the grower uses the chart to make product purchasing decisions before the growing season begins.

Figure 14B:
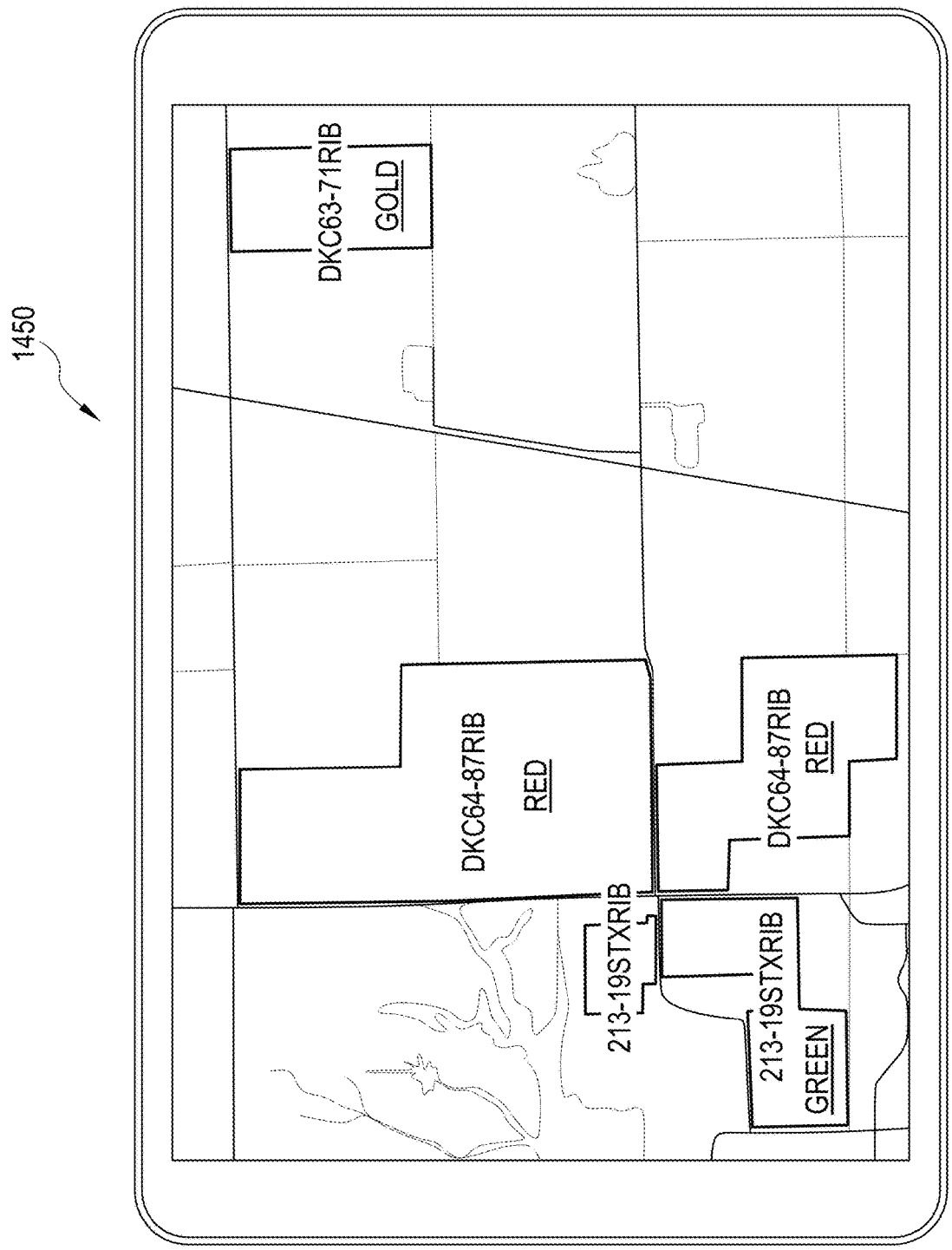

FIG. 14(b) shows an example field map that includes the RM distribution of FIG. 14(a) overlaid on digital imagery of the corresponding fields in which the RMs are to be planted. The RM distribution overly is generated using an augmented reality technique, in an embodiment. A field map such as FIG. 14(b) is another type of output that may be produced by operation 1125 of FIG. 11(a). In an embodiment, a map such as FIG. 14(B) is sent to a field manager's mobile device and the field manager uses the map to determine which product RMs to load into a planter, for example.

In FIG. 14(b), the augmented reality overlays are color-coded according to field readiness as dynamically determined by operation 1130 of FIG. 11(a). Fields marked as green are ready to be planted while fields marked red are not ready to be planted, and fields marked yellow may be planted with caution. The color codings shown in FIG. 14(b) are updated dynamically as dynamic adaptation operation 1130 receives new weather forecast data 1128. In an embodiment, a color-coded map such as FIG. 14(b) is sent to a field manager's mobile device and the field manager uses the map to determine an order in which particular fields are planted, for example.

Figure 14C:
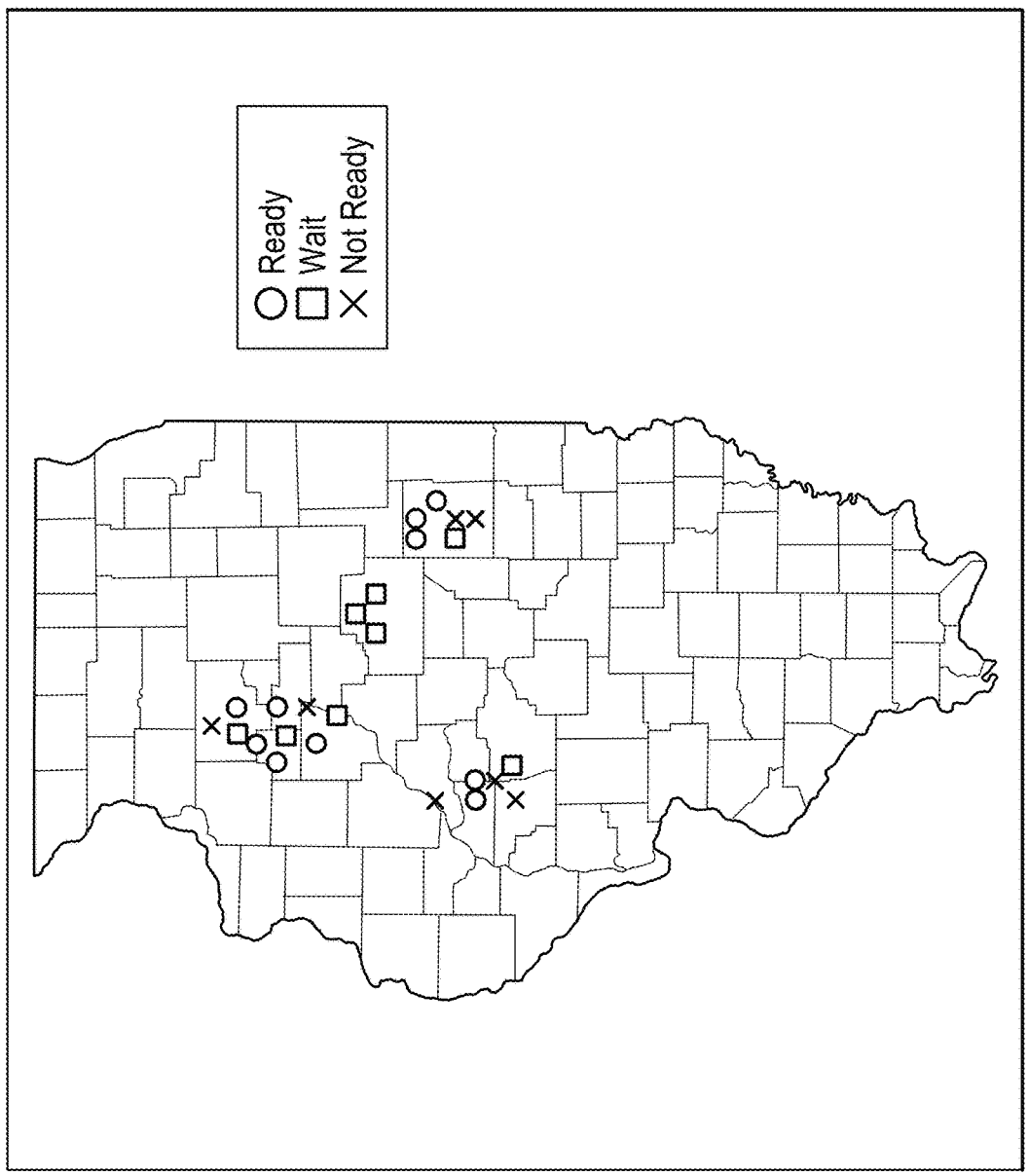
Figure 14E:
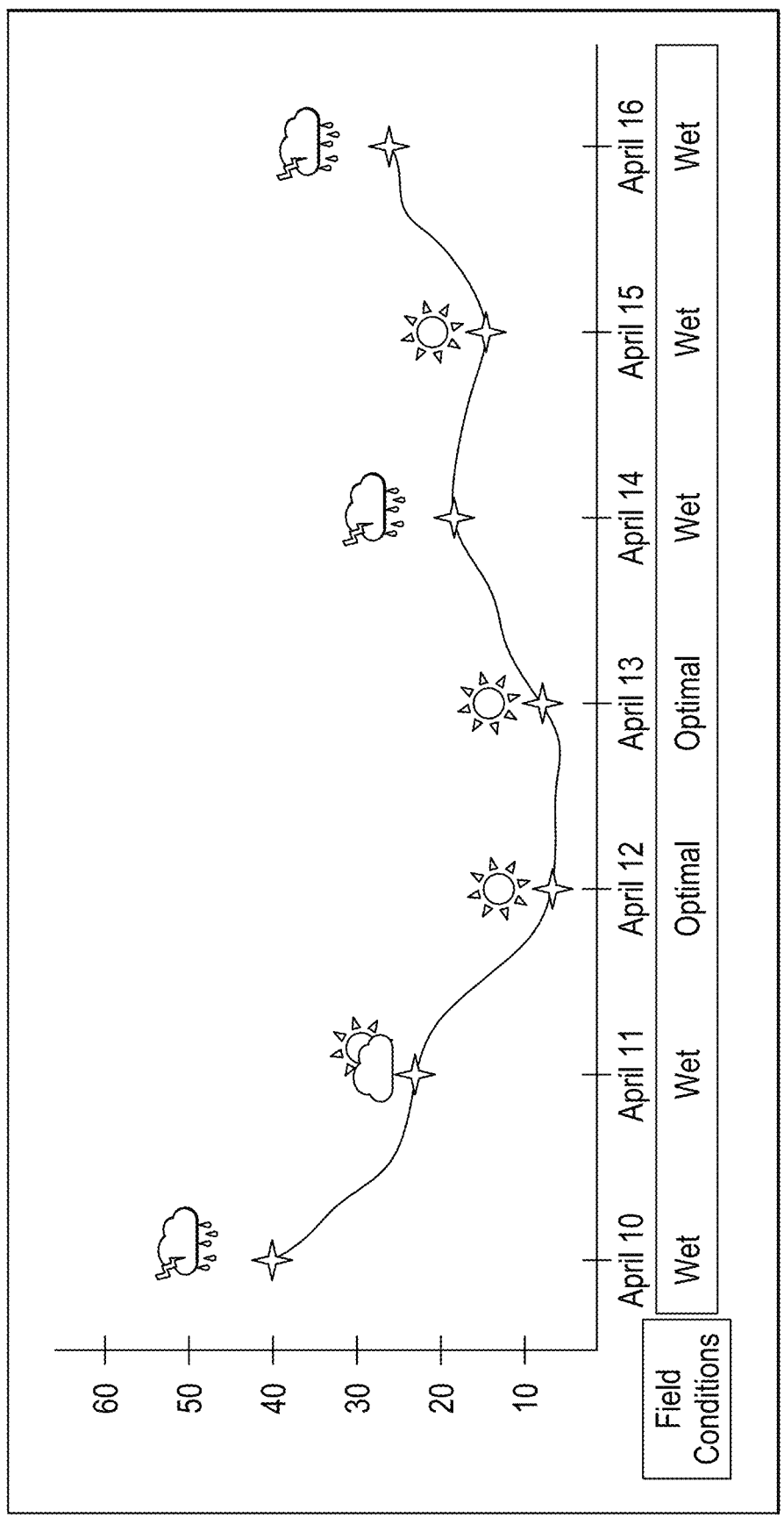

FIG. 14(c), FIG. 14(d), and FIG. 14(e) show additional output that may be generated by planting plan optimization operation 1125 in cooperation with dynamic adjustment operation 1130 of FIG. 11(a). FIG. 14(c) shows an example plot of field readiness indicators aligned with corresponding geographic locations across a grower's entire growing operation. The field readiness indicators are coded, for example color coded, and are overlaid on a geographic map of the growing region using, for example, an augmented reality technique.

FIG. 14(d) shows an example of spreadsheet or tabular output of planting plan optimization operation 1125 generated in cooperation with dynamic adjustment operation 1130, which includes detailed information about the computed risk scores for a number of different stress risks. Selecting, for example by clicking or tapping on the user interface display, the icon in the fifth column of FIG. 14(d) causes display of the detailed field readiness risk predictions that are shown in FIG. 14(e), which are computed by dynamic adaptation operation 1130. In the illustrated embodiment, the field readiness risk score is computed as a composite of early season, flowering and harvest stress risks as discussed above. A lower risk score indicates a higher degree of field readiness for planting. FIG. 14(e) shows an example of a calendar-based visualization in which changes in field readiness are mapped to days of the growing season for which current weather forecast data has been received.

4.4 Example POW Models

Planting optimization window (POW) models use the above-described technologies to seek to optimize harvest through 2 mechanisms: relative maturity (RM) and planting time.

RM Optimization

The RM optimization model seeks to optimize the relative maturity (RM) spread of all hybrids in a grower portfolio. The RM optimization model uses long range data; that is, historic data, and generates predictions prior to the start of the growing season (for example, 8-10 months in advance). The predictions generated by the RM optimization model are used to select hybrids for the upcoming growing season and assign the hybrids to fields of the growing operation.

Planting Time Optimization

The planting time optimization models seek to optimize planting time for all hybrids selected using the RM optimization across all fields of a grower's operation. Planting time optimization includes a static model (outputs long-range, pre-planting recommendations or a 'static planting plan')

and a dynamic model (outputs short-range/near-term adjustments based on observed and forecasted weather).

Inputs to the RM and planting time POW models include predicted weather scenarios and other crop, environment and management factors, including the grower's historic planting and harvest operations data.

Static Planting Plans

A static planting plan output by the POW models includes recommended planting dates for various field-product-RM combinations. The POW model can generate the planting date recommendations based on harvest moisture window predictions produced by a HOW model. An example of a recommendation produced by the POW model is for a grower to plant a particular hybrid RM in a particular field at a particular time that is predicted to enable harvest in an optimal grain moisture window but is also before a fall frost risk for that field. Key inputs for the static POW model may include but are not necessarily limited to:

Estimated Insurance cut-off date for an area
Hybrid RM-AERM match
Predicted Late Spring Frost Date
Predicted heat stress during flowering
Predicted drought stress during flowering
Predicted disease/pest risk during flowering
Predicted First Fall Frost date
Predicted Harvest Grain moisture for a hybrid-field combination Dynamic Planting Plans A dynamic POW model produces a planting plan that includes an in-season near-term (for example, real-time or daily) prediction of planting readiness for a field-hybrid RM combination. An objective for this model is to aid the grower in staying within their optimal static planting plan for their operation as produced by the static POW model. Since weather is the biggest variable during planting time, the dynamic POW model takes as inputs short-range (for example, daily) observed weather data and short-range forecasted weather data. Output of the dynamic POW model includes predictions of field readiness conditions. Output of the dynamic POW model can be used to, for example, move or route agricultural machines such as planters, or to make adjustments to the hybrid-field assignments if the predicted field readiness excess a threshold indicating that field readiness is delayed by a certain amount. Output from the dynamic POW model can be fed into a decision support tool to optimize planting operations. Inputs for the dynamic POW model may include but are not necessarily limited to:

Field readiness index
Pre-planting ponding risk
Post-planting ponding risk
Risk of emergence non-uniformity After implementation for grower fields, the POW models and algorithms can continue to be fine-tuned based on the results of the previous set of predictions.

5. Additional Examples

Illustrative examples of the technologies disclosed herein are provided below. An embodiment of the technologies may include any of the examples or a combination of the described below.

In an example 1, a computer-implemented method for generating an improved digital plan for agricultural fields associated with a grower operation during a growing season, the method including receiving, by a predictive model, a set of digital inputs relating to a digital plan; where the set of digital inputs includes, for products to be planted in the agricultural fields, stress risk data and at least one of product maturity data, field location data, planting date data, harvest date data; where the predictive model has been trained to mathematically correlate sets of digital inputs with predictive threshold data that is associated with the stress risk data; using the predictive model, generating, as digital output in response to the set of digital inputs, stress risk prediction data for a set of product maturity and field location combinations; where the stress risk prediction data indicates a mathematical likelihood of actual harvest data matching desired harvest data on a particular date during the growing season; where the actual harvest data includes product moisture measured at harvest resulting from planting of a product in accordance with the digital plan; where the desired harvest data indicates moisture associated with a desired product yield; creating and digitally storing an improved digital plan by adjusting the product maturity data or the planting date data or the harvest date data or the field location data based on the stress risk prediction data; transmitting the improved digital plan to a field manager computing device associated with the grower operation and causing display of the improved digital plan on a display of the field manager computing device or causing movement of an agricultural apparatus in response to the improved digital plan.

An example 2 includes the subject matter of example 1, where the stress risk prediction data indicates a prediction of any one or more of yield, harvest moisture, field readiness for planting. An example 3 includes the subject matter of example 1 or example 2, where the digital plan identifies a distribution of product maturities across the agricultural fields, and the improved digital plan is created by changing the distribution of product maturities across the agricultural fields based on the stress risk prediction data. An example 4 includes the subject matter of any of examples 1-3, where the digital plan indicates an assignment of a product maturity to an agricultural field and the improved digital plan is created by changing the assignment of the product maturity to the agricultural field based on the stress risk prediction data. An example 5 includes the subject matter of any of examples 1-4, where the digital plan indicates an assignment of a planting date or a harvest date to an agricultural field and the improved digital plan is created by changing the assignment of the planting date or the harvest date to the agricultural field based on the stress risk prediction data. An example 6 includes the subject matter of any of examples 1-5, further including, using the predictive model, where the stress risk data is associated with at least two different stages of a grower operation for a particular agricultural field. An example 7 includes the subject matter of any of examples 1-6, further including adjusting the improved digital plan in response to changes in weather forecast data obtained after the digital plan has been created. An example 8 includes the subject matter of any of examples 1-7, where at least some of the set of digital inputs are received using electronic communication with an agricultural apparatus. An example 9 includes the subject matter of any of examples 1-8, where the improved digital plan includes a digital visualization of product maturity allocations to agricultural fields. An example 10 includes the subject matter of any of examples 1-9, where the predictive model is trained using a computer-implemented supervised machine learning algorithm including a random forest algorithm or a gradient boosting algorithm. An example 11 includes one or more non-transitory storage media storing instructions which, when executed by one or more computing devices, cause performance of operations recited in any of examples 1-10. An example 12 includes a computer system configured to cause performance of operations recited in any of examples 1-10.

In an example 13, a computer-implemented method for generating an improved digital plan for an agricultural field associated with a grower operation and a product planted in the agricultural field during a growing season includes receiving, by a predictive model, a set of digital inputs relating to a digital plan and a prediction date that is after the product has been planted in the agricultural field during the growing season; where the set of digital inputs includes, for the agricultural field, observed weather data collected during the growing season to the prediction date and forecasted weather data computed for a future date range after the prediction date during the growing season, and for the product planted in the agricultural field, planting date data and product maturity data; where the predictive model has been trained to mathematically correlate sets of digital inputs with threshold data associated with harvest moisture; using the predictive model, generating, as digital output in response to the set of digital inputs, harvest moisture prediction data for the future date range for the product planted in the agricultural field; where the harvest moisture prediction data indicates a mathematical likelihood of actual harvest moisture data matching desired harvest moisture data during the future date range; where the actual harvest data includes product moisture measured at harvest resulting from planting of the product in accordance with the digital plan; where the desired harvest moisture data indicates moisture associated with a desired product yield; creating and digitally storing an improved digital planting plan including a harvest date recommended based on the harvest moisture prediction data; transmitting the improved digital plan to a field manager computing device associated with the grower operation and causing display of the improved digital plan on a display of the field manager computing device or causing movement of an agricultural apparatus in response to the improved digital plan.

An example 14 includes the subject matter of example 13, and further includes in response to a new prediction date following the prediction date, receiving, by a predictive model, a new set of digital inputs relating to the digital plan and the new prediction date; using the predictive model, generating, as digital output in response to the new set of digital inputs, new harvest moisture prediction data for a new future date range for the product planted in the agricultural field; creating and digitally storing a new improved digital plan by adjusting the harvest date based on the new harvest moisture prediction data; transmitting the new improved digital plan to a field manager computing device associated with the grower operation and causing display of the new improved digital plan on a display of the field manager computing device. An example 15 includes the subject matter of example 14, further including repeating the receiving, generating, creating, and transmitting on a periodic basis or a daily basis.

An example 16 includes the subject matter of any of examples 13-15, further including: inputting the harvest moisture prediction data into a second predictive model; using the second predictive model, generating, for a product and agricultural field combination, recommendation data including at least one of a relative maturity recommendation, a planting date recommendation, and a harvest date recommendation; transmitting the recommendation data to a computing device associated with the grower operation and causing display of the recommendation data on a display of the computing device or causing movement of an agricultural apparatus in response to the recommendation data. An example 17 includes one or more non-transitory storage media storing instructions which, when executed by one or more computing devices, cause performance of operations recited in any of examples 13-16. An example 18 includes a computer system configured to cause performance of operations recited in any of examples 13-16.

In an example 19, a computer-implemented method for generating an improved digital plan for an agricultural field associated with a grower operation and a product to be planted in the agricultural field during a growing season, the method including: receiving, by a predictive model, a set of digital inputs relating to a digital plan and a prediction date that is during the growing season and before the product is planted; where the set of digital inputs includes, for the agricultural field, observed weather data collected during the growing season up to the prediction date and forecasted weather data computed for a future date range after the prediction date during the growing season, and for the product to planted in the agricultural field, product maturity data; where the predictive model has been trained to mathematically correlate sets of digital inputs with threshold data associated with field readiness; using the predictive model, generating, as digital output in response to the set of digital inputs, field readiness prediction data for the future date range for the product to be planted in the agricultural field; where the field readiness prediction data indicates a mathematical likelihood of actual field readiness data matching desired field readiness data; creating and digitally storing an improved digital plan by adjusting a planting date based on the field readiness prediction data; transmitting the improved digital plan to a field manager computing device associated with the grower operation and causing display of the improved digital plan on a display of the field manager computing device or causing movement of an agricultural apparatus in response to the improved digital plan.

An example 20 includes the subject matter of example 19, further including repeating the receiving, generating, creating, and transmitting on a periodic basis or a daily basis. An example 21 includes one or more non-transitory storage media storing instructions which, when executed by one or more computing devices, cause performance of operations recited in any of examples 19-20. An example 22 includes a computer system configured to cause performance of operations recited in any of examples 19-20.

In an example 23, a computer-implemented method includes one or more aspects of any of examples 1-22 and includes receiving training data from grower fields and/or research and development fields, including kernel moisture content values that are digitally stored in association with date values on which the moisture content values were obtained, and field geo-location values for fields from which the moisture content values were obtained; receiving grower-specific input data including weather, genetics, and field operations values; optionally programmatically calling a fertility model process to obtain a predicted date at which the crop represented in the genetics values will reach the R6 growth stage based on the weather values and field operations values; evaluating the trained machine learning model based on grower-specific input data to output a predicted kernel moisture value at the R6 date; repeating the evaluating for a plurality of other dates before and after the predicted R6 date until the output predicted moisture values are outside a specified range, resulting in creating and storing a range of dates during which kernel moisture content is predicted to fall within the specified range; optionally calculating a best path or shortest path for a set of agricultural equipment to traverse a set of fields on different recommended harvest activity dates by balancing harvest date and travel distance; outputting the range of the dates, which represent recommended harvest activity dates for specified fields and hybrids; optionally transmitting instructions to a combine or harvester to cause repositioning that equipment to a specified field on a specified date to start harvest in that field on that date.

6. Benefits, Extensions and Alternatives

The techniques of this disclosure offer numerous practical benefits and improvements. For example, predictions generated by embodiments can be used to improve the positioning of agricultural machines at planting time and/or at harvest time. Graphical displays, of field data, such as field maps that may be displayed on a cab computer, also can be improved based on predictions that are generated by embodiments. In this manner, the disclosure integrates the processes that are described into practical applications including but not limited to improving machine operations associated with agricultural planting and harvesting. Furthermore, the disclosure provides clear improvements to the technologies of agriculture, agriscience, crop management and field management, as well as graphical user interfaces and graphical information displays.

All processes disclosed herein are intended to be implemented using programmed computers to accomplish the benefits and improvements that are described above via specific processes that are disclosed. The disclosure is directed to these processes, not to concepts. Nothing in the disclosure is intended or should be interpreted as disclosing or claiming an abstract idea, product of nature, law of nature or natural phenomenon. Nothing in the disclosure is intended or should be interpreted as disclosing or claiming only mathematical concepts, certain methods of organizing human activity or mental processes, and any interpretation of the claims to cover any of the foregoing cannot be reasonable in view of the disclosure and this paragraph.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for generating an improved digital plan for agricultural fields associated with a grower operation during a growing season, the method comprising:
   receiving, by a predictive model, a set of digital inputs relating to a digital plan;
   wherein the set of digital inputs comprises, for products to be planted in the agricultural fields, stress risk data and at least one of product maturity data, field location data, planting date data, harvest date data;
   wherein the predictive model has been trained to mathematically correlate sets of digital inputs with predictive threshold data that is associated with the stress risk data;
   using the predictive model, generating, as digital output in response to the set of digital inputs, stress risk prediction data for a set of product maturity and field location combinations;
   wherein the stress risk prediction data indicates a mathematical likelihood of actual harvest data matching desired harvest data on a particular date during the growing season;
   wherein the actual harvest data includes product moisture measured at harvest resulting from planting of a product in accordance with the digital plan;
   wherein the desired harvest data indicates moisture associated with a desired product yield;
   creating and digitally storing an improved digital plan by adjusting the product maturity data or the planting date data or the harvest date data or the field location data based on the stress risk prediction data;
   transmitting the improved digital plan to a field manager computing device associated with the grower operation and causing display of the improved digital plan on a display of the field manager computing device or causing movement of an agricultural apparatus in response to the improved digital plan.

2. The method of claim 1, wherein the stress risk prediction data indicates a prediction of any one or more of yield, harvest moisture, field readiness for planting.

3. The method of claim 1, wherein the digital plan identifies a distribution of product maturities across the agricultural fields, and the improved digital plan is created by changing the distribution of product maturities across the agricultural fields based on the stress risk prediction data.

4. The method of claim 1, wherein the digital plan indicates an assignment of a product maturity to an agricultural field and the improved digital plan is created by changing the assignment of the product maturity to the agricultural field based on the stress risk prediction data.

5. The method of claim 1, wherein the digital plan indicates an assignment of a planting date or a harvest date to an agricultural field and the improved digital plan is created by changing the assignment of the planting date or the harvest date to the agricultural field based on the stress risk prediction data.

6. The method of claim 1, further comprising, using the predictive model, wherein the stress risk data is associated with at least two different stages of a grower operation for a particular agricultural field.

7. The method of claim 1, further comprising adjusting the improved digital plan in response to changes in weather forecast data obtained after the digital plan has been created.

8. The method of claim 1, wherein at least some of the set of digital inputs are received using electronic communication with an agricultural apparatus.

9. The method of claim 1, wherein the improved digital plan comprises a digital visualization of product maturity allocations to agricultural fields.

10. The method of claim 1, wherein the predictive model is trained using a computer-implemented supervised machine learning algorithm comprising a random forest algorithm or a gradient boosting algorithm.

11. One or more non-transitory storage media storing instructions which, when executed by one or more computing devices, cause performance of operations recited in claim 1.

12. A computer system configured to cause performance of operations recited in claim 1.

13. A computer-implemented method for generating an improved digital plan for an agricultural field associated with a grower operation and a product planted in the agricultural field during a growing season, the method comprising:

receiving, by a predictive model, a set of digital inputs relating to a digital plan and a prediction date that is after the product has been planted in the agricultural field during the growing season;

wherein the set of digital inputs comprises, for the agricultural field, observed weather data collected during the growing season to the prediction date and forecasted weather data computed for a future date range after the prediction date during the growing season, and for the product planted in the agricultural field, planting date data and product maturity data;

wherein the predictive model has been trained to mathematically correlate sets of digital inputs with threshold data associated with harvest moisture;

using the predictive model, generating, as digital output in response to the set of digital inputs, harvest moisture prediction data for the future date range for the product planted in the agricultural field;

wherein the harvest moisture prediction data indicates a mathematical likelihood of actual harvest moisture data matching desired harvest moisture data during the future date range;

wherein the actual harvest data includes product moisture measured at harvest resulting from planting of the product in accordance with the digital plan;

wherein the desired harvest moisture data indicates moisture associated with a desired product yield;

creating and digitally storing an improved digital planting plan including a harvest date recommended based on the harvest moisture prediction data;

transmitting the improved digital plan to a field manager computing device associated with the grower operation and causing display of the improved digital plan on a display of the field manager computing device or causing movement of an agricultural apparatus in response to the improved digital plan.

14. The computer-implemented method of claim 13, further comprising:

in response to a new prediction date following the prediction date, receiving, by a predictive model, a new set of digital inputs relating to the digital plan and the new prediction date;

using the predictive model, generating, as digital output in response to the new set of digital inputs, new harvest moisture prediction data for a new future date range for the product planted in the agricultural field;

creating and digitally storing a new improved digital plan by adjusting the harvest date based on the new harvest moisture prediction data;

transmitting the new improved digital plan to a field manager computing device associated with the grower operation and causing display of the new improved digital plan on a display of the field manager computing device.

15. The computer-implemented method of claim 14, further comprising repeating the receiving, generating, creating, and transmitting on a periodic basis or a daily basis.

16. The computer-implemented method of claim 13, further comprising:

inputting the harvest moisture prediction data into a second predictive model;

using the second predictive model, generating, for a product and agricultural field combination, recommendation data comprising at least one of a relative maturity recommendation, a planting date recommendation, and a harvest date recommendation;

transmitting the recommendation data to a computing device associated with the grower operation and causing display of the recommendation data on a display of the computing device or causing movement of an agricultural apparatus in response to the recommendation data.

17. One or more non-transitory storage media storing instructions which, when executed by one or more computing devices, cause performance of operations recited in claim 13.

18. A computer system configured to cause performance of operations recited in claim 13.

19. A computer-implemented method for generating an improved digital plan for an agricultural field associated with a grower operation and a product to be planted in the agricultural field during a growing season, the method comprising:

receiving, by a predictive model, a set of digital inputs relating to a digital plan and a prediction date that is during the growing season and before the product is planted;

wherein the set of digital inputs comprises, for the agricultural field, observed weather data collected during the growing season up to the prediction date and forecasted weather data computed for a future date range after the prediction date during the growing season, and for the product to planted in the agricultural field, product maturity data;

wherein the predictive model has been trained to mathematically correlate sets of digital inputs with threshold data associated with field readiness;

using the predictive model, generating, as digital output in response to the set of digital inputs, field readiness prediction data for the future date range for the product to be planted in the agricultural field;

wherein the field readiness prediction data indicates a mathematical likelihood of actual field readiness data matching desired field readiness data;

creating and digitally storing an improved digital plan by adjusting a planting date based on the field readiness prediction data;

transmitting the improved digital plan to a field manager computing device associated with the grower operation and causing display of the improved digital plan on a display of the field manager computing device or causing movement of an agricultural apparatus in response to the improved digital plan.

20. The computer-implemented method of claim 19, further comprising repeating the receiving, generating, creating, and transmitting on a periodic basis or a daily basis.

21. One or more non-transitory storage media storing instructions which, when executed by one or more computing devices, cause performance of operations recited in claim 19.

22. A computer system configured to cause performance of operations recited in claim 19.

* * * * *

UNITED STATES PATENT AND TRADEMARK OFFICE
CERTIFICATE OF CORRECTION

PATENT NO. : 11,017,306 B2
APPLICATION NO. : 16/661860
DATED : May 25, 2021
INVENTOR(S) : Shilpa Sood et al.

It is certified that error appears in the above-identified patent and that said Letters Patent is hereby corrected as shown below:

In the Claims

Claim 6, Column 42, Lines 43-44: remove "further comprising, using the predictive model,"

Signed and Sealed this
Eleventh Day of June, 2024

Katherine Kelly Vidal
*Director of the United States Patent and Trademark Office*